US012725629B2

(12) United States Patent
Wang et al.

(10) Patent No.: US 12,725,629 B2
(45) Date of Patent: Sep. 1, 2026

(54) METHOD AND APPARATUS FOR MEASURING SPEECH-IMAGE SYNCHRONICITY, AND METHOD AND APPARATUS FOR TRAINING MODEL

(71) Applicant: MaShang Consumer Finance Co., Ltd., Chongqing (CN)

(72) Inventors: Chun Wang, Chongqing (CN); Dingheng Zeng, Chongqing (CN); Haiying Wu, Chongqing (CN); Xunyi Zhou, Chongqing (CN); Ning Jiang, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 265 days.

(21) Appl. No.: 18/395,253

(22) Filed: Dec. 22, 2023

(65) Prior Publication Data

US 2024/0135956 A1 Apr. 25, 2024

Related U.S. Application Data

(63) Continuation of application No. PCT/CN2022/114952, filed on Aug. 25, 2022.

(30) Foreign Application Priority Data

Sep. 9, 2021 (CN) ........................ 202111056592.5
Sep. 9, 2021 (CN) ........................ 202111057976.9
Sep. 9, 2021 (CN) ........................ 202111058177.3

(51) Int. Cl.
*G10L 25/57* (2013.01)
*G06V 40/16* (2022.01)
*G10L 15/24* (2013.01)

(52) U.S. Cl.
CPC ............ *G10L 25/57* (2013.01); *G06V 40/165* (2022.01); *G06V 40/168* (2022.01); *G10L 15/24* (2013.01)

(58) Field of Classification Search
CPC ....... G10L 25/57; G10L 15/24; G06V 40/168; G06V 40/165
See application file for complete search history.

(56) References Cited

U.S. PATENT DOCUMENTS 6,219,639 B1 4/2001 Bakis et al.
8,185,481 B2 * 5/2012 Long .................. G06F 18/2323 706/12

(Continued)

FOREIGN PATENT DOCUMENTS

CN 101199207 A 6/2008
CN 101199208 A * 6/2008 ........... G06V 40/171

(Continued)

OTHER PUBLICATIONS

Shao et al. (Gait Recognition based on Improved LeNet Network, 2020 IEEE 4th Information Technology, Networking, Electronic and Automation Control Conference (ITNEC), 2020 (Year: 2020).*

(Continued)

*Primary Examiner* — Bhavesh M Mehta
*Assistant Examiner* — Eunice Lee
(74) *Attorney, Agent, or Firm* — Davis Wright Tremaine LLP

(57) ABSTRACT

The application provides a method and an apparatus for measuring speech-image synchronicity, and a method and an apparatus for training a model, where the method for measuring speech-image synchronicity includes: acquiring a speech segment and an image segment of a video, where there is a correspondence between the speech segment and the image segment in the video; processing the speech (Continued)

segment and the image segment to obtain a speech feature of the speech segment and a visual feature of the image segment; and determining, according to the speech feature of the speech segment and the visual feature of the speech segment, whether there is synchronicity between the speech segment and the image segment, where the synchronicity is used for characterizing matching between a sound in the speech segment and a movement of a target character in the image segment.

20 Claims, 16 Drawing Sheets

(56) References Cited

U.S. PATENT DOCUMENTS

| | | | | |
|---|---|---|---|---|
| 9,799,096 | B1 | 10/2017 | De la Torre et al. | |
| 10,127,437 | B2 * | 11/2018 | Bhanu | G06V 40/176 |
| 10,376,153 | B2 * | 8/2019 | Tzvieli | A61B 5/165 |
| 10,902,243 | B2 * | 1/2021 | Wang | G06V 40/161 |
| 2002/0116196 | A1 * | 8/2002 | Tran | G06F 1/3203 704/E15.045 |
| 2003/0154084 | A1 | 8/2003 | Li et al. | |
| 2004/0120554 | A1 | 6/2004 | Lin et al. | |
| 2008/0111887 | A1 | 5/2008 | Cooper et al. | |
| 2009/0310828 | A1 * | 12/2009 | Kakadiaris | G06V 40/168 382/118 |
| 2018/0096119 | A1 | 4/2018 | Yun et al. | |
| 2018/0144160 | A1 | 5/2018 | Shirakura | |
| 2018/0144746 | A1 | 5/2018 | Mishra et al. | |
| 2019/0005976 | A1 | 1/2019 | Peleg et al. | |
| 2019/0139563 | A1 * | 5/2019 | Chen | G06N 3/084 |
| 2021/0110831 | A1 | 4/2021 | Shillingford et al. | |
| 2021/0158086 | A1 | 5/2021 | Salamon et al. | |
| 2021/0209388 | A1 * | 7/2021 | Ciftci | G06N 3/045 |
| 2021/0272571 | A1 * | 9/2021 | Balasubramaniam | G10L 15/02 |
| 2021/0312628 | A1 * | 10/2021 | Larlus-Larrondo | G06N 3/084 |
| 2023/0039641 | A1 * | 2/2023 | Zhang | G06N 3/0464 |
| 2023/0335107 | A1 * | 10/2023 | Zhao | G10L 15/16 |
| 2024/0038238 | A1 * | 2/2024 | Qin | G10L 15/25 |

FOREIGN PATENT DOCUMENTS

| | | | | |
|---|---|---|---|---|
| CN | 102169642 | A | 8/2011 | |
| CN | 107977629 | A | 5/2018 | |
| CN | 110503942 | A | 11/2019 | |
| CN | 110610534 | A | 12/2019 | |
| CN | 110677598 | A | 1/2020 | |
| CN | 110866140 | A | 3/2020 | |
| CN | 111091824 | A | 5/2020 | |
| CN | 111145282 | A | 5/2020 | |
| CN | 111225237 | A | 6/2020 | |
| CN | 111370020 | A | 7/2020 | |
| CN | 111414862 | A | 7/2020 | |
| CN | 111462733 | A | 7/2020 | |
| CN | 111507218 | A | 8/2020 | |
| CN | 111833902 | A | 10/2020 | |
| CN | 111881726 | A | 11/2020 | |
| CN | 111916054 | A | 11/2020 | |
| CN | 111930992 | A | 11/2020 | |
| CN | 112465008 | A | 3/2021 | |
| CN | 112562720 | A * | 3/2021 | G06V 40/161 |
| CN | 112949481 | A | 6/2021 | |
| CN | 113111812 | A | 7/2021 | |
| CN | 113314104 | A | 8/2021 | |
| CN | 114466178 | A | 5/2022 | |
| CN | 114466179 | A | 5/2022 | |
| CN | 114494930 | A | 5/2022 | |
| EP | 0674315 | A1 | 9/1995 | |
| JP | 2019049829 | A | 3/2019 | |
| JP | 2021086274 | A | 6/2021 | |
| KR | 20130098457 | A | 9/2013 | |
| KR | 102148607 | B1 | 8/2020 | |
| KR | 20210089249 | A | 7/2021 | |
| KR | 20210108689 | A | 9/2021 | |
| WO | WO-2006079813 | A1 * | 8/2006 | G10H 1/366 |
| WO | 2021043168 | A1 | 3/2021 | |
| WO | 2021104110 | A1 | 6/2021 | |
| WO | WO-2023018405 | A1 * | 2/2023 | G10L 21/10 |
| WO | 2023035969 | A1 | 3/2023 | |

OTHER PUBLICATIONS

Wang D, et al., Learning descriptors with cube loss for view-based 3-D object retrieval, IEEE Transactions on Multimedia, 2019 (Year: 2019).*

Al-Agha, Salwa A. et al., "Multi-Model Emotion Expression Recognition for Lip Synchronization", 1st International Conference of Information Technology to enhance E-learning and other Application, (IT-ELA 2020), IEEE, 7 pages.

Chao, Huang, et al., "Research and Implementation of Content Detection System for Violent and Terrorist Audio and Video", Communications Technology, Jan. 2018, vol. 51, No. 1, 7 pages.

China National Intellectual Property Office, "Notification to Grant" in application No. 202111058177.3, Aug. 29, 2023, 14 pages.

Chung, Joon Son, et al., "Out of Time: Automated Lip Sync in the Wild" Computer Vision ACCV 2016 Workshops, Mar. 16, 2017, 14 pages.

International Search Report and Written Opinion for Application No. PCT/CN2022/114952, mailed Nov. 16, 2022, 16 pages.

Office Action for Chinese Application No. 202111058177.3, mailed Jun. 16, 2023, 10 pages.

Zeng, Ding-Heng, et al., "An Incremental Learning Face Detection Algorithm Oriented to Wireless Video Browsing", Institute of Microelectronic of Chinese Academy of Sciences, Beijing, vol. 35, No. 6, 2014, 5 pages.

Zhou, Xunyi, et al., "The Effect of Co-Articulation in Sentences on Syllable Perception" Issue 3, China Academic Journal Electronic Publishing House, Nov. 11, 2002, 5 pages.

The State Intellectual Property Office of People's Republic of China, "Notification to Grant Patent Right for Invention" in Application No. 202111056592.5, Dec. 20, 2024, 6 pages.

The State Intellectual Property Office of People's Republic of China, "First Office Action" in Application No. 202111057976.9, Mar. 12, 2024, 15 pages.

The State Intellectual Property Office of People's Republic of China, "First Office Action" in Application No. 2021111056592.5, Feb. 21, 2024, 15 pages.

Thies, Justus et al., "Face2Face: Real-time Face Capture and Reenactment of RGB Videos", Computer Science, Computer Vision and Pattern Recognition, Jul. 29, 2020, 9 pages.

European Patent Office, "Search Report" in Application No. 22866437.1-1207, Nov. 9, 2024, 9 pages.

* cited by examiner

METHOD AND APPARATUS FOR MEASURING SPEECH-IMAGE SYNCHRONICITY, AND METHOD AND APPARATUS FOR TRAINING MODEL

CROSS-REFERENCE TO RELATED APPLICATIONS

This application is a continuation of International Application No. PCT/CN2022/114952, filed on Aug. 25, 2022, which claims priority to Chinese Patent Application No. 202111057976.9 filed on Sep. 9, 2021, Chinese Patent Application No. 202111056592.5 filed on Sep. 9, 2021, and Chinese Patent Application No. 202111058177.3 filed on Sep. 9, 2021, all of the aforementioned applications are hereby incorporated in their entireties.

TECHNICAL FIELD

The application relates to the field of video processing technology and, in particular, to a method and an apparatus for measuring speech-image synchronicity, a method and an apparatus for training a model.

BACKGROUND

In a video, images and speeches are generally included. Moreover, when a character in the video speaks, a mouth movement of the character in an image should be synchronized with a speech made by the character.

In order to measure whether mouth movements of the character in the video are synchronized with the speeches made by the character, SyncNet model is generally used. For the so-called SyncNet model, reference may be made to a literature "Out of time: automated lip sync in the wild" by Chung, Joon Son, and Andrew Zisserman at the Asian Conference on Computer Vision; Springer, Cham, 2016 (Chung, Joon Son, and Andrew Zisserman "Out of time: automated lip sync in the wild", Asian Conference on Computer Vision, Springer, Cham, 2016). Generally, a speech segment of a video is input into a neural network, and an image segment of the video is input into another neural network, to obtain a speech feature and a visual feature. Then, through a comparison of the speech feature with the visual feature, a determination is made on whether the mouth movements of the character in the video are synchronized with the speeches made by the character.

However, using the SyncNet model to measure whether the mouth movements of the character in the video are synchronized with the speeches made by the character is still low in accuracy.

SUMMARY

In a first aspect of the application, a method for measuring speech-image synchronicity is provided, which includes:

acquiring a speech segment and an image segment of a video, where there is a correspondence between the speech segment and the image segment in the video; processing the speech segment and the image segment to obtain a speech feature of the speech segment and a visual feature of the image segment; and determining, according to the speech feature of the speech segment and the visual feature of the image segment, whether there is synchronicity between the speech segment and the image segment, where the synchronicity is used for characterizing matching between a sound in the speech segment and a movement of a target character in the image segment.

In a second aspect of the application, a method for training a model for measuring speech-image synchronicity is provided, which includes: processing a first image segment as first image data, processing a first speech segment as first speech data, and processing a second speech segment as second speech data; processing a random image segment as second image data, and processing a random speech segment as third speech data; combining the first image data and the first speech data into positive samples; combining the first image data and the second speech data into first negative samples; combining the first image data and the third speech data into second negative samples; combining the first speech data or the second speech data, and the second image data into third negative samples; training the model for measuring speech-image synchronicity using the positive samples, the first negative samples, the second negative samples and the third negative samples.

In a third aspect of the application, an apparatus for measuring speech-image synchronicity is provided, which includes:

a receiving module, configured to acquire a speech segment and an image segment of a video, where there is a correspondence between the speech segment and the image segment in the video; a data processing module, configured to process the speech segment and the image segment to obtain a speech feature of the speech segment and a visual feature of the image segment; and a synchronicity measuring module, configured to determine whether there is synchronicity between the speech segment and the image segment according to the speech feature of the speech segment and the visual feature of the image segment, where the synchronicity is used for characterizing matching between a sound in the speech segment and a movement of a target character in the image segment.

In a fourth aspect of the application, an apparatus for training a model for measuring speech-image synchronicity is provided. The apparatus includes: a data processing module, configured to process a first image segment as first image data, process a first speech segment as first speech data, and process a second speech segment as second speech data; the data processing module is further configured to process a random image segment as second image data, and process a random speech segment as third speech data; a sample generating module, configured to combine the first image data and the first speech data into positive samples; the sample generating module is further configured to combine the first image data and the second speech data into first negative samples; the sample generating module is further configured to combine the first image data and the third speech data into second negative samples; the sample generating module is further configured to combine the first speech data or the second speech data, and the second image data into third negative samples; and a training module, configured to train the model for measuring speech-image synchronicity using the positive samples, the first negative samples, the second negative samples and the third negative samples.

In a fifth aspect of the application, an electronic device is provided, which includes a processor, a memory, and a bus; where the processor and the memory communicate with each other through the bus; and the processor is configured to call program instructions in the memory to execute the method of the first aspect or the second aspect.

In a sixth aspect of the application, a computer-readable storage medium is provided, which includes a stored program; where the program, when running, controls a device on which the storage medium is located to execute the method of the first aspect or the second aspect.

In a seventh aspect, a computer program product is provided, where a computer program is stored on the computer program product, and when the computer program is executed by a processor, the method of the first aspect or the second aspect is implemented.

In an eighth aspect, a computer program is provided, where when the computer program is executed by a processor, the method of the first aspect or the second aspect is implemented.

BRIEF DESCRIPTION OF THE DRAWINGS

By referring to the accompanying drawings and reading the detailed description below, the above and other purposes, features, and advantages of the exemplary embodiments of the application will become readily comprehensible. In the accompanying drawings, several embodiments of the application are shown in an exemplary rather than restrictive manner, with the same or corresponding numerals representing the same or corresponding parts.

DESCRIPTION OF EMBODIMENTS

Exemplary embodiments of the application will be described in more detail below with reference to the accompanying drawings. Although the exemplary embodiments of the application are shown in the accompanying drawings, it should be understood that the application can be implemented in various forms and should not be limited by the embodiments described here. On the contrary, these implementations are provided in order to have a more thorough understanding of the application and to fully convey the scope of the application to technical personnel in the art.

It should be noted that unless otherwise specified, the technical or scientific terms used in the application shall have the usual meaning understood by those skilled in the field to which the application belongs.

In related art, the SyncNet model is used to measure whether a mouth movement of a character in a video is synchronized with a speech made by the character, which is of low accuracy.

After careful research, the inventors found that the SyncNet model has a low accuracy in measuring synchronicity between a mouth movement and a speech in that two neural networks are needed in the SyncNet model. One is a speech neural network configured to extract a speech feature. The other one is a visual neural network configured to extract a visual feature. Neither the speech neural network nor the visual neural network can be trained independently of the personal feature(s) of a speaker. That is to say, when using samples for training, the samples carry the personal features of speakers, and the trained network also learns the personal features of the speakers in the samples. Among them, the personal features of the speakers include personal speech features (such as, a timbre, an intonation, etc.), personal visual features (such as, thin and thick lips, mouth size, etc.), etc. For a speaker not covered in the samples, the accuracy of a speech feature and a visual feature obtained through the speech neural network and the visual neural network will decrease.

Figure 1A:
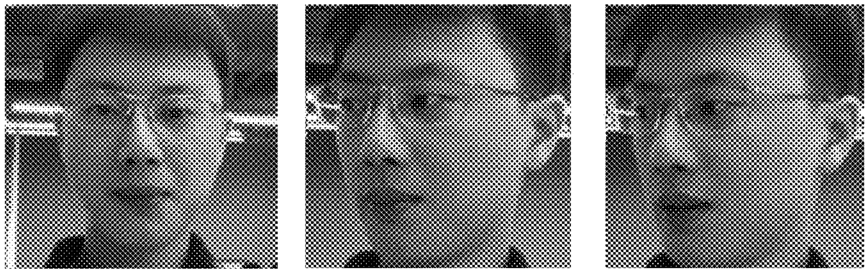
FIG. 1A is a schematic diagram I of an image segment in an embodiment of the application.

In addition, on the one hand, the SyncNet model is also difficult to be independent of a coordinate system. That is to say, when extracting a visual feature through the visual neural network, the main focus is on extracting a mouth feature. The extraction of the mouth feature is very sensitive to mouth alignment. When the speaker conducts three-dimensional movements such as head turning, it becomes difficult to ensure alignment of the mouth. The coupling of a relative movement caused by mouth alignment and a mouth movement caused by speaking significantly reduces the accuracy of the SyncNet model in extracting the mouth feature. FIG. 1A is a schematic diagram of an image segment in an embodiment of the application. As shown in FIG. 1, there are three frames of image in the image segment. In the first frame of image, a character is speaking. In the second frame of image, the head of the character rotates, and a position and a scaling ratio of the mouth in the image are also different from those of a front face of the character in the first frame of image. In the third frame of image, the character continues to speak. However, compatible processing on this three-dimensional movement in a two-dimensional manner with use of the SyncNet model will definitely affect the accuracy of synchronicity measurement between a mouth movement and a speech.

Figure 1B:
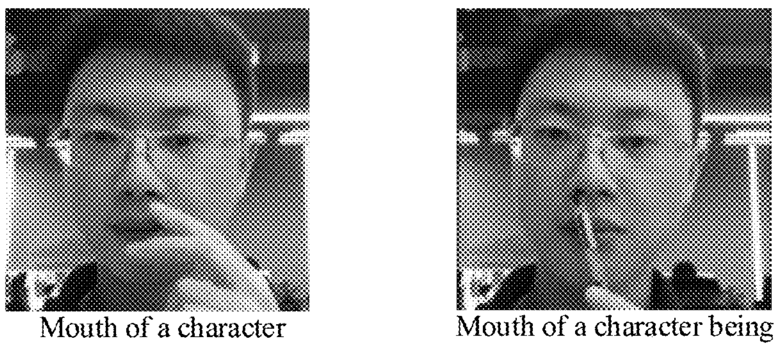
FIG. 1B is a schematic diagram II of an image segment in an embodiment of the application.

On the other hand, the SyncNet model has poor robustness with respect to occlusion in images. That is to say, when the face of the speaker in the image is partially occluded, the visual neural network cannot accurately extract a mouth feature of the speaker, and an extracted mouth feature includes a feature of an occlusion. This will also reduce the accuracy of synchronicity measurement between a mouth movement and a speech. FIG. 1B is a schematic diagram II of an image segment in an embodiment of the application. As shown in FIG. 1B, in these two images, the mouth of a character is partially occluded by fingers and a pen, respectively. This occlusion will affect mouth alignment in the image, and an obtained mouth feature will also be mixed with the occlusion, thereby affecting the accuracy of synchronicity measurement between a mouth movement and a speech.

In view of this, an embodiment of the application provides a method for measuring speech-image synchronicity. In this method, a feature related to an individual character is removed from a speech segment or an image segment followed by processing on the speech segment or the image segment, and then processing with regard to feature extraction is performed on speech data or image data obtained from processing the speech segment or the image segment. In this way, the obtained speech feature or visual feature will no longer carry the personal feature of the speaker, thereby improving the accuracy of measurement of speech-image synchronicity. Alternatively, features related to an individual character can be removed from both a speech segment and an image segment followed by processing on the speech segment and the image segment, and then processing with regard to feature extraction can be performed on speech data and image data obtained from processing the speech segment and the image segment. In this way, the obtained speech and visual features will no longer carry the personal features of the speaker, thereby improving the accuracy of measurement of speech-image synchronicity.

Figure 2:
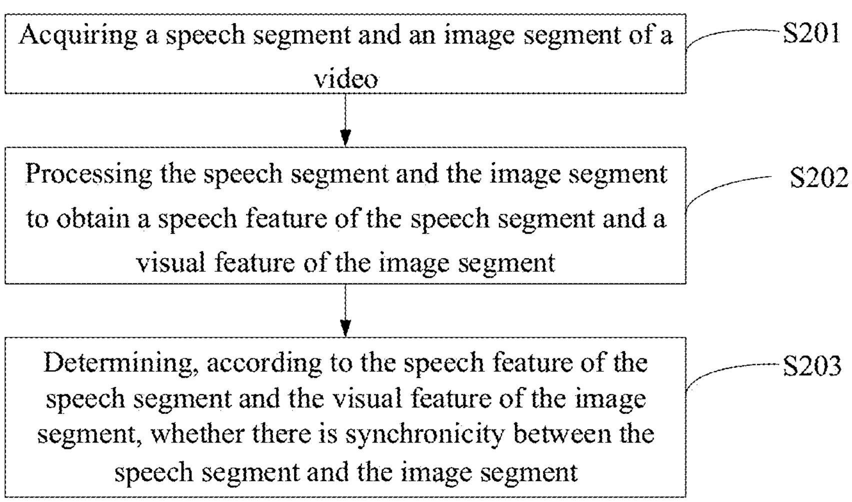
FIG. 2 is a schematic flowchart of a method for measuring speech-image synchronicity in an embodiment of the present application.

FIG. 2 is a schematic flowchart of a method for measuring speech-image synchronicity in an embodiment of the present application. As shown in FIG. 2, the method may include the following.

S201: acquiring a speech segment and an image segment of a video.

Among them, there is a correspondence between the speech segment and the image segment in the video.

The so-called correspondence refers to the selected speech segment and image segment having the same starting time and ending time in the video, or having a certain degree of temporal misalignment (which is acceptable within a visual range for human eyes).

S202: processing the speech segment and the image segment to obtain a speech feature of the speech segment and a visual feature of the image segment.

In an implementation, S202 specifically includes: converting the speech segment into a specific signal, wherein the specific signal is independent of a personal feature of a speaker in the speech segment; acquiring a speech feature of the specific signal as the speech feature of the speech segment; and acquiring a visual feature of the image segment.

In an implementation, S202 specifically includes: generating a contour map of a target character according to the image segment, wherein the contour map is independent of a personal feature of the target character; acquiring a visual feature of the contour map as the visual feature of the image segment; and acquiring a speech feature of the speech segment.

In an implementation, S202 specifically includes: converting the speech segment into a specific signal, wherein the specific signal is independent of a personal feature of a speaker in the speech segment; generating a contour map of a target character according to the image segment, wherein the contour map is independent of a personal feature of the target character; acquiring a speech feature of the specific signal as the speech feature of the speech segment; and acquiring a visual feature of the contour map as the visual feature of the image segment.

S203: determining, according to the speech feature of the speech segment and the visual feature of the image segment, whether there is synchronicity between the speech segment and the image segment.

Among them, the synchronicity is used for characterizing matching between a sound in the speech segment and a movement of a target character in the image segment.

In an implementation, the above speech feature of the speech segment is compared with the visual feature of the image segment through an algorithm with comparison function. And whether there is synchronicity between the speech segment and the image segment may be determined according to the comparison result. The synchronicity here is used for characterizing matching between a sound in the speech segment and a movement of a target character in the image segment. That is to say, according to the comparison result, whether the meaning of the sound in the speech segment is the same as the meaning of a movement of the target character in the image segment may be determined. It can also be understood that a sound made by a movement of the target character in the image segment is semantically and temporally identical to a sound in the speech segment.

Figure 3A:
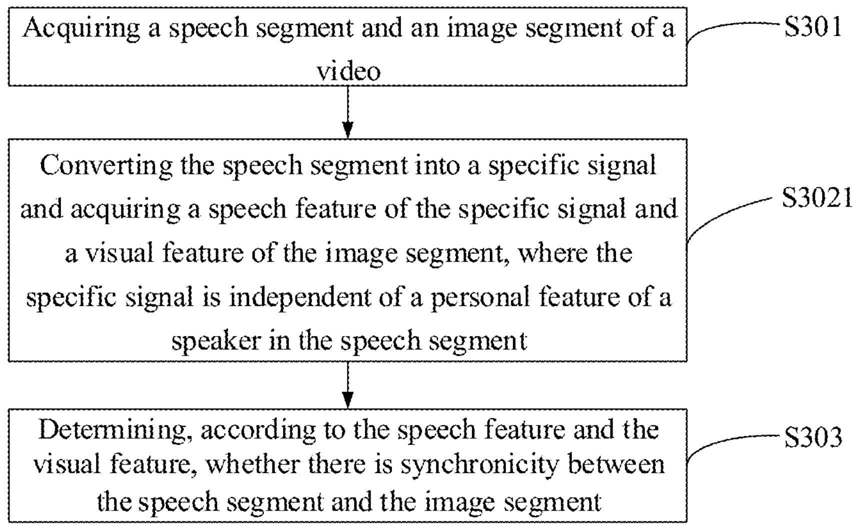
FIG. 3A is a flowchart of a method for measuring speech-image synchronicity in an embodiment of the application.

FIG. 3A is a flowchart of a method for measuring speech-image synchronicity in an embodiment of the application. As shown in FIG. 3A, the method may include the following.

S301: acquiring a speech segment and an image segment of a video.

The video here refers to a video for which synchronicity between images and speeches included in the video is to be determined. The synchronicity here is used for characterizing matching between a sound in the speech segment and a movement of a target character in the image segment.

The so-called matching refers to that a sound made by a movement of the target character in the image segment is semantically and temporally identical to a sound in the speech segment of a video. Among them, the movement of the target character generally refers to a movement of a lower half face of the target character, which can be specifically a mouth-related movement.

For example, if the mouth of the target character in the image segment undergoes a mouth movement making the sound of "apple", and the sound in the speech segment is also "apple", then it can be considered that there is synchronicity between the speech segment and the image segment. Furthermore, if the mouth of the target character in the image segment undergoes a mouth movement making the sound of "apple", and the sound in the speech segment is "banana", then it can be considered that there is no synchronicity between the speech segment and the image segment.

Generally speaking, a part of images in the video are measured together with corresponding speeches rather than directly measuring all images in the video together with all speeches. The selected part of images serve as the image segment of the video, and correspondingly, the selected speeches serve as the speech segment of the video. There is a correspondence between the selected speech segment and the selected image segment in the video.

The so-called correspondence refers to that the selected speech segment and the selected image segment have the same starting time and the same ending time in the video, or have a certain degree of temporal misalignment (which is acceptable within a visual range for human eyes).

An example is taken to obtain images and speeches corresponding to frames 1 to 10 in a video. The images from frames 1 to 10 in the video constitute the image segment, and the speeches from frames 1 to 10 in the video constitutes the speech segment. The frames 1 to 10 here are specific locations. The specific locations for obtaining an image segment and a speech segment may be set according to an actual situation, which are not specifically restricted here.

Of course, the image segment may also be a certain image frame, and the corresponding speech segment may also be a speech of that frame and speeches of frames before and after that frame.

After the determination is made to whether there is synchronicity between a part of images and corresponding speeches in the video, it is then determined whether there is synchronicity between another part of images and corresponding speeches in the video, until the determination of synchronicity between all the images and corresponding speeches in the video is completed.

S3021: converting the speech segment into a specific signal and acquiring a speech feature of the specific signal and a visual feature of the image segment, where the specific signal is independent of a personal feature of a speaker in the speech segment.

In an implementation, the aforementioned speech feature and the visual feature may be extracted through a model for measuring speech-image synchronicity. The model for measuring speech-image synchronicity may include a speech neural network, a visual neural network, and a synchronicity measuring module. Among them, the speech neural network may be used to extract a speech feature of an input signal (such as the specific signal), and the visual neural network may be used to extract a visual feature of an input signal (such as the image segment), and the synchronicity measuring module may be used to determine whether there is synchronicity between the speech segment and the image segment.

Specifically, the speech segment may be input into the speech neural network through which the speech segment is processed, and an output of the speech neural network is the speech feature. The speech neural network here may be any type of neural network that can obtain a speech feature from a speech segment. There is no specific restriction on the specific type of the speech neural network here. The image segment is input into the visual neural network through which the image segment is processed, and an output of the visual neural network is the visual feature. The visual neural network here may be any type of neural network that can obtain a visual feature from an image segment. There is no specific restriction on the specific type of the visual neural network here.

Before the speech segment is input into the speech neural network to obtain the speech feature, a personal feature of a character can be removed from the speech segment followed by processing on the speech segment, that is, a semantic feature unrelated to the personal feature of the character in the speech is extracted from the speech segment.

For example, different people may vary in terms of timbre, intonation, and other aspects. Some people have a mellow and solid timbre, while others have a bright and clear timbre. Some people have a gentle intonation, while others have a high pitched intonation. If speech segments are directly input into the speech neural network, the obtained speech features will include personal features of the individuals, which will reduce the accuracy of measurement of speech-voice synchronicity. Moreover, if speech segments including personal features are input into the speech network for training, the trained network cannot accurately obtain speech features of characters not included in the training samples, thereby reducing the accuracy of subsequent speech-voice synchronicity measurement. Therefore, before inputting the speech segment into the speech neural network, the speech segment is first converted into the specific signal, and only a semantically related feature in the speech segment is extracted to avoid extracting the personal feature of the character. For example, only the speech content itself in the speech segment is extracted, without extracting timbre. In this way, the personal feature in the speech segment is removed, and the speech segment is converted into the specific signal which is then input into the speech neural network. In the obtained speech feature, the presence of the personal feature of the character is avoided, thereby improving the accuracy of measurement of speech-voice synchronicity.

The speech feature corresponding to the speech segment and the visual feature corresponding to the image segment may be obtained through a model for measuring speech-image synchronicity. Before the speech segment and the image segment are input into the model for measuring speech-image synchronicity for processing, the speech segment may be processed while the image segment may not be processed, and the image segment and the processed speech data may be input into the model for measuring speech-image synchronicity to obtain the visual feature and the speech feature respectively. The specific manners for processing the speech segment and the image segment, as well as the specific manners for training the model for measuring speech-image synchronicity, will be described in detail below.

S303: determining, according to the speech feature and the visual feature, whether there is synchronicity between the speech segment and the image segment, where the synchronicity is used for characterizing matching between a sound in the speech segment and a movement of a target character in the image segment.

As mentioned above, the model for measuring speech-image synchronicity may include a synchronicity measuring module. After the speech neural network of the model for measuring speech-image synchronicity outputs the speech feature, and the visual neural network of the model for measuring speech-image synchronicity outputs the visual feature, the synchronicity measuring module compares the speech feature with the visual feature through an algorithm with a comparison function. And whether there is synchronicity between the speech segment and the image segment may be determined according to the comparison result. The synchronicity here is used for characterizing matching between a sound in the speech segment and a movement of a target character in the image segment. That is to say, it can be determined, according to the comparison result, whether the meaning of the sound in the speech segment is the same as the meaning of a movement of the target character in the image segment. It can also be understood that a sound made by a movement of the target character in the image segment is semantically and temporally identical to a sound in the speech segment.

Generally speaking, the output is a numerical value between 0 and 1. And a threshold between 0 and 1 is set. If the output value is greater than or equal to such threshold, it indicates that a similarity between the speech feature and the visual feature is relatively high, and there is synchronicity between the speech segment and the image segment. If the output value is less than such threshold, it indicates that a similarity between the speech feature and the visual feature is relatively low, and there is no synchronicity between the speech segment and the image segment. There is no specific limitation on a specific range of the numerical value and the threshold here.

In the method for measuring speech-image synchronicity mentioned above, after acquiring a speech segment and an image segment of a video, the speech segment is first converted into a specific signal which is independent of a personal feature of a speaker in the speech segment; then a speech feature of the specific signal and a visual feature of the image segment are acquired; and finally, whether there is synchronicity between the speech segment and the image segment is determined according to the speech feature and the visual feature. That is to say, a feature related to an individual character in the speech segment is removed followed by processing on the speech segment, and then processing with regard to feature extraction is performed on the specific signal or the image segment. In this way, the obtained speech feature will no longer carry the personal feature of the speaker, thereby improving the accuracy of measurement of speech-image synchronicity.

Figure 3B:
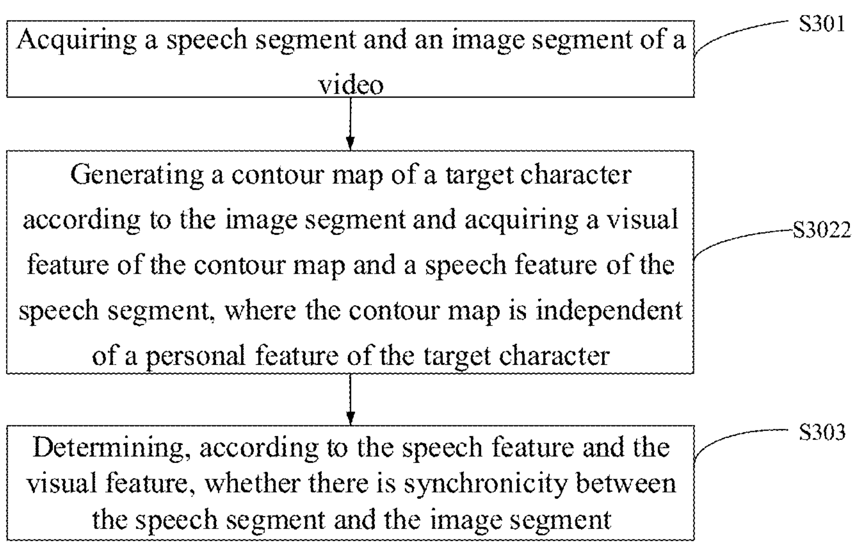
FIG. 3B is a flowchart of another method for measuring speech-image synchronicity in an embodiment of the application.

In an implementation, as shown in FIG. 3B, a method for measuring speech-image synchronicity may include the following steps.

S301: acquiring a speech segment and an image segment of a video.

For the specific implementation of S301, reference may be made to the above description, which will not be repeated here.

S3022: generating a contour map of a target character according to the image segment and acquiring a visual feature of the contour map and a speech feature of the speech segment, where the contour map is independent of a personal feature of the target character.

In an implementation, the aforementioned speech feature and visual feature may be extracted through a model for measuring speech-image synchronicity. The model for measuring speech-image synchronicity may include a speech neural network, a visual neural network, and a synchronicity measuring module. Among them, the speech neural network may be used to extract a speech feature of an input signal (such as the speech segment), and the visual neural network may be used to extract a visual feature of an input signal (such as the contour map), and the synchronicity measuring module may be used to determine whether there is synchronicity between the speech segment and the image segment.

Before inputting the image segment into the visual neural network to obtain the visual feature, a personal feature of a character in the image segment is removed followed by processing on the image segment, that is, a character feature unrelated to the personal feature of the character in the image is extracted from the image segment.

For example, different people may vary in terms of lip thickness and size. Some people have thick lips, while others have thin lips; some have large mouths, while others have small mouths. If image segments are directly input into the visual neural network, the obtained visual features will include personal features of individual ones, which will reduce the accuracy of measurement of image-speech synchronicity. Moreover, if image segments including personal features are input into the visual neural network for training, the trained network cannot accurately obtain visual features of characters not included in the training samples, thereby reducing the accuracy of subsequent measurement of image-speech synchronicity. Therefore, before inputting the image segment into the visual neural network, extraction is performed on the image segment firstly, and only features related to a movement of a lower face of the character in the image segment are extracted from the image segment, without extracting a personal feature of the character, for example, only a degree of opening and closing of the mouth is extracted, without extracting lip thickness. Furthermore, by combining the extracted features related to a movement of the character, a pose or an expression of the character may be obtained, which in turn leads to the contour map of the target character in the image segment. Furthermore, by inputting the contour map into the visual neural network, the presence of the personal feature of character can be avoided in the obtained visual feature, thereby improving the accuracy of measurement of image-speech synchronicity.

The speech feature corresponding to the speech segment and the visual feature corresponding to the image segment may be obtained through a model for measuring speech-image synchronicity. Before inputting the speech segment and the image segment into the model for measuring speech-image synchronicity for processing, the image segment may be processed while the speech segment may not be processed, and then the speech segment together with image data obtained from the processing may be input into the model for measuring speech-image synchronicity, to obtain the speech feature and the visual feature respectively. The specific manners for processing the speech segment and the image segment, as well as the specific manners for training the model for measuring speech-image synchronicity, will be described in detail below.

S303: determining, according to the speech feature and the visual feature, whether there is synchronicity between the speech segment and the image segment, where the synchronicity is used for characterizing matching between a sound in the speech segment and a movement of a target character in the image segment.

For the specific implementation of S303, reference may be made to the above description, which will not be repeated here.

In the method for measuring speech-image synchronicity as mentioned above, after acquiring a speech segment and an image segment of a video, a contour map of a target character is first generated according to the image segment, where the counter map is independent of a personal feature of the target character; then a speech feature of the speech segment and a visual feature of the contour map are acquired; and finally, whether there is synchronicity between the speech segment and the image segment is determined according to the speech feature and the visual feature. That is to say, a feature related to an individual character in the image segment is removed followed by processing on the image segment, and then feature extraction is performed on the speech segment and the contour map. In this way, the obtained visual feature will no longer carry the personal feature of the speaker, thereby improving the accuracy of measurement of speech-image synchronicity.

Figure 3C:
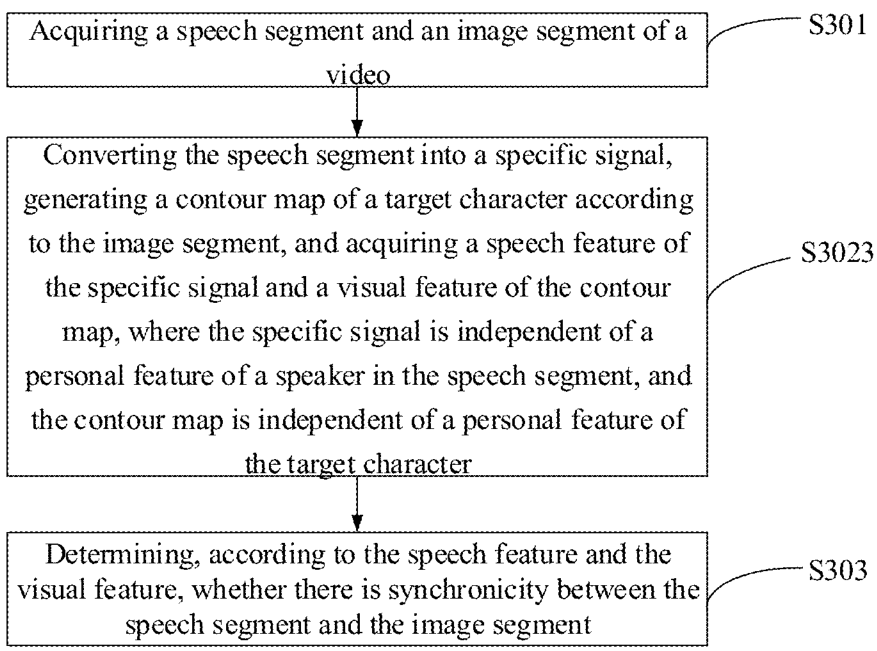
FIG. 3C is a flowchart of yet another method for measuring speech-image synchronicity in an embodiment of the application.

In an implementation, as shown in FIG. 3C, a method for measuring speech-image synchronicity may include the following steps.

S301: acquiring a speech segment and an image segment of a video.

S3023: converting the speech segment into a specific signal, generating a contour map of a target character according to the image segment, and acquiring a speech feature of the specific signal and a visual feature of the contour map, where the specific signal is independent of a personal feature of a speaker in the speech segment, and the contour map is independent of a personal feature of the target character.

For the specific implementation of S3023, reference may be made to the descriptions of S3021 and S3022 above, which will not be repeated here.

Specifically, in step S3023, both of the speech segment and the image segment are processed respectively, and corresponding features are extracted from the processed specific signal and contour map.

S303: determining, according to the speech feature and the visual feature, whether there is synchronicity between the speech segment and the image segment, where the synchronicity is used for characterizing matching between a sound in the speech segment and a movement of a target character in the image segment.

For the specific implementation of S303, reference may be made to the above description, which will not be repeated here.

In the method for measuring speech-image synchronicity as mentioned above, after acquiring a speech segment and an image segment of a video, the speech segment is first converted into a specific signal which is independent of a personal feature of a speaker in the speech segment, and a contour map of a target character is generated according to the image segment, where the contour map is independent of a personal feature of the target character; then a speech feature of the specific signal and a visual feature of the contour map are acquired; and finally, whether there is synchronicity between the speech segment and the image segment is determined according to the speech feature and the visual feature. That is to say, features related to individual characters in the speech segment and the image segment are removed followed by processing on the speech segment and the image segment, and then processing with regard to feature extraction is performed on the speech segment and the image segment. In this way, the obtained speech feature and visual feature will no longer carry the personal feature of the speaker, thereby improving the accuracy of measurement of speech-image synchronicity.

Figure 4:
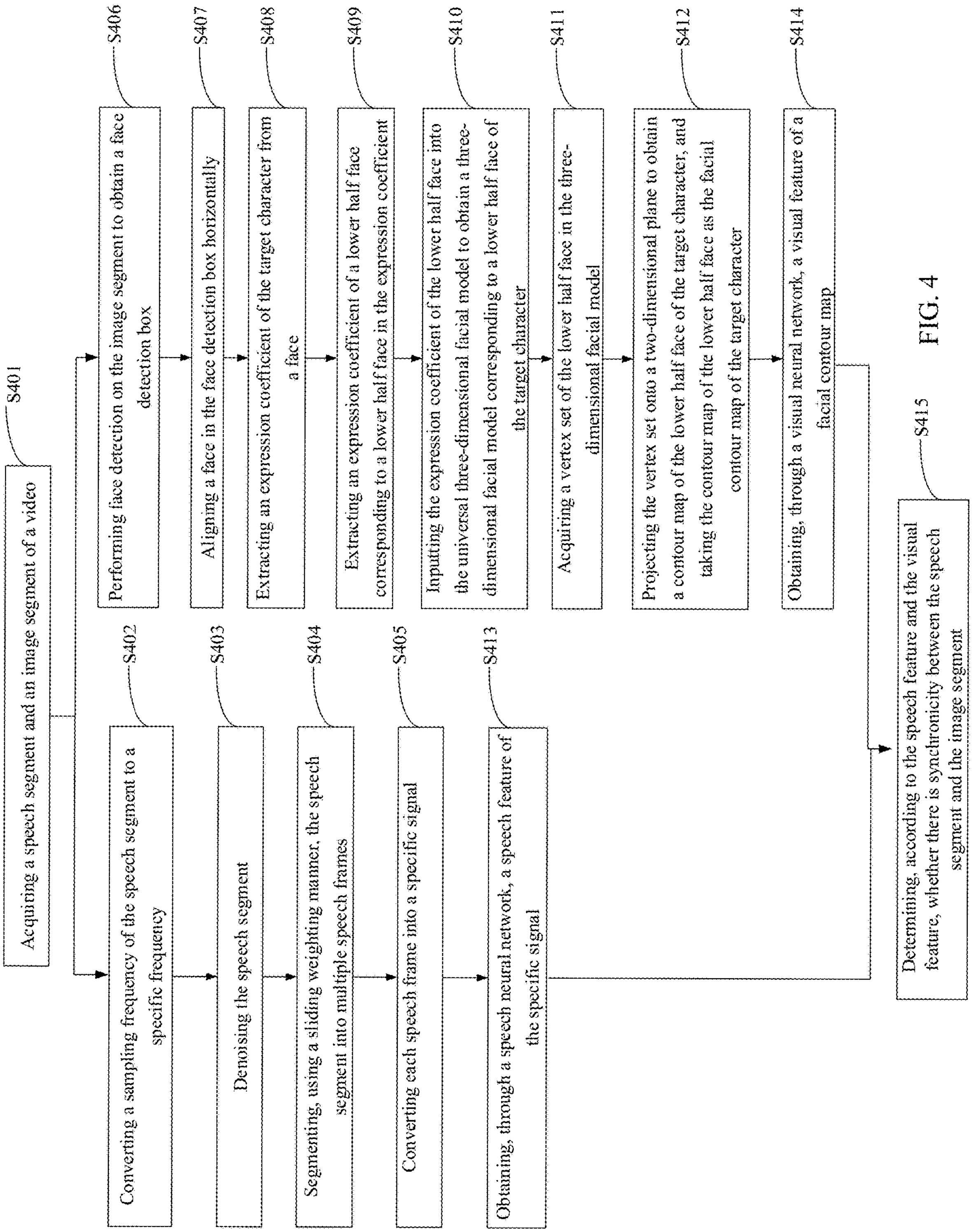
FIG. 4 is a flowchart of a method for measuring speech-image synchronicity in an embodiment of the application.

Furthermore, as a refinement and extension of the method shown in FIG. 3, an embodiment of the application also provides a method for measuring speech-image synchronicity. FIG. 4 is a flowchart of a method for measuring speech-image synchronicity in an embodiment of the application. As shown in FIG. 4, the method may include the following.

S401: acquiring a speech segment and an image segment of a video.

The implementation of step S401 is the same as that of step S301, which will not be repeated here.

From speech and image perspectives, detailed description is made hereunder to procedures of processing a speech segment and/or an image segment before inputting it(them) into a model for measuring speech-image synchronicity, and processing it(them) into speech data and image data accordingly.

1. In Terms of Processing for the Speech Segment

Since the speech segment includes a personal feature of a speaker, such as a timbre, an intonation, etc., before inputting the speech segment into the speech neural network to obtain the speech feature, the personal feature of the speaker in the speech segment is first erased, and then speech data in which the personal feature of the speaker has been erased is input into the speech neural network, thereby improving the accuracy of synchronization comparison between speeches and images.

After acquiring the speech segment and the image segment of the video in S401, the specific steps for processing the speech segment may include the following.

S402: converting a sampling frequency of the speech segment to a specific frequency.

After a separation of the speech segment from the video and a change to a single channel, the sampling frequency of the speech also varies due to different configurations of terminals for video acquisition. In order to accurately process the speech segment in the future, it is necessary to first unify the sampling frequency of the speech segment.

In practical applications, the sampling frequency of the speech segment may be unified to 16 kHz. Of course, the sampling frequency of the speech segment may also be unified to other numerical values, such as 8 kHz, 20 kHz, etc. The specific numerical value may be set according to an actual situation, and there is no restriction here.

S403: denoising the speech segment.

Here, step S403 may include two aspects.

S4031: removing a background sound from the speech segment.

Specifically, the speech segment may be subject to denoising through a spectral subtraction method in short-term spectral estimation, to suppress the background sound and highlight the speech within the speech segment. Of course, other methods may also be used to remove the background sound from the speech segment, such as the adaptive filtering technology. As for the specific method to remove the background sound from the speech segment, there is no restriction here.

S4032: separating speeches of different speakers in the speech segment, to obtain at least one speech sub-segment.

Sometimes in a speech segment, not only one person is speaking, and there may be multiple people speaking at the same time. Therefore, it is necessary to separate the speeches of different speakers in the speech segment and obtain speech sub-segments of the respective speakers respectively.

After obtaining the speech sub-segments of multiple speakers, sometimes it is simply necessary to determine whether there is synchronicity between a speech of a certain speaker and an image, and sometimes it is necessary to determine whether there is synchronicity between speeches of multiple speakers and images. At this point, based on actual judgment, speech sub-segments of a certain speaker or speech sub-segments of several speakers may be selected as the speech segment after denoising.

S404: segmenting, using a sliding weighting manner, the speech segment into multiple speech frames.

Among them, there is an overlap between adjacent speech frames.

Specifically, a window function may be used to perform sliding weighting on the speech segment for segmentation into multiple speech frames. The window function may be a Hamming window function or window functions of other types. The segmented multiple speech frames may be multiple segments of 25 ms or segments of other lengths. Each segment is called a speech frame. The overlap between adjacent speech frames is generally maintained at 10 ms, this is because the pronouncement of a single sound may not have finished if the speech frame is too short. Therefore, maintaining a certain degree of overlap between adjacent speech frames can contribute to better semantics understanding, thereby improving the accuracy of measurement of speech-image synchronicity.

It should be noted that steps S402, S403, and S404 may be executed in any order, rather than in the order of their sequence numbers, and there is no specific restriction on the execution sequence of steps S402, S403, and S404 here. Regardless of the number of steps executed in steps S402, S403, and S404, in subsequent conversion into a specific signal, a processing result of the executed steps is taken as the processing object to be converted into the specific signal. For example, if step S402 is executed, the speech segment converted to a specific frequency is converted into a specific signal during conversion; if step S403 is executed, the speech sub-segment is converted into a specific signal during conversion; if step S404 is executed, each speech frame is converted into a specific signal as described in step S405 during conversion.

S405: converting each speech frame into a specific signal.

Among them, the specific signal is independent of a personal feature of a speaker in the speech segment.

In the related art, before inputting the speech segment into a speech neural network, it is necessary to first convert the speech segment into a Mel-scale Frequency Cepstral Coefficients (Mel-scale Frequency Cepstral Coefficients, MFCC) signal, and then input the MFCC signal into the speech neural network to obtain a corresponding speech feature. However, in the MFCC signal, the personal feature of the speaker, i.e., identity information from the speech segment cannot be effectively erased, resulting in that the obtained speech feature also includes the identity information of the speaker, thereby reducing the accuracy of measurement of speech-image synchronicity.

In view of this, before inputting the speech segment into a speech neural network, the speech segment may be converted into a specific signal firstly. The specific signal here is independent of the personal feature of the speaker in the speech segment, which means that the personal feature of the speaker in the speech segment can be better erased. In this way, by inputting the specific signal into the speech neural network, the obtained speech feature will no longer include the personal feature of the speaker, thereby improving the accuracy of measurement of speech-image synchronicity.

In a practical application, the specific signal may be a phonetic posterior grams (Phonetic Posterior Grams, PPG) signal. In the PPG signal, information related to an identity of the speaker can be better erased from the speech segment. Moreover, in the PPG signal, a background sound can be further erased from the speech segment, reducing a variance of an input of the speech neural network, thereby improving the accuracy of measurement of speech-image synchronicity.

Of course, the speech segment may also be converted into other types of signals, such as a feature extracted by the DeepSpeech model, as long as identity information of the speaker can be erased. There is no restriction on the specific type of the specific signal here.

In a practical application, in order to convert the speech segment into a PPG signal, the speech segment may be input into a speaker-independent automatic speech recognition (Speaker-Independent Automatic Speech Recognition, SI-ASR) system through which the speech segment is processed and the PPG signal is generated. In the SI-ASR system, the using of the international phoneme alphabet can expand adaptation languages, and a specific dimension P of the PPG signal and the number of phonemes supported by the SI-ASR are related to supported languages. The SI-ASR system, which supports both Chinese and English, is used here, supporting a total of P=400 phonemes. The PPG signal obtained from per speech frame is a 1×400 dimensional eigenvector. The PPG signal obtained from T consecutive speech frames is a T×400 dimensional feature matrix. Corresponding adjustments may be made based on the number of supported phonemes if other SI-ASR systems are used.

Of course, the speech segment may also be converted, in other manners, into a signal in which the identity information of the speaker is erased, such as a deep learning model DeepSpeech. This deep learning model may convert a speech signal into corresponding text. Therefore, in a feature extracted by the DeepSpeech, only speech content exists, and there is no personal feature, such as a timbre of the speaker. In this way, content which is semantically irrelevant, such as the identity information of the speaker and the background sound can also be erased after the extraction.

Figure 5:
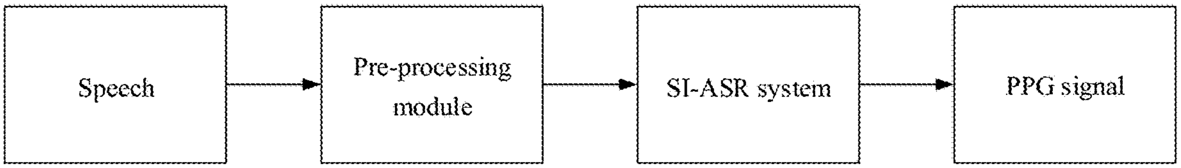
FIG. 5 is a schematic diagram of a process for processing a speech segment in an embodiment of the application.

The above processing process may also be carried out through the flowchart shown in FIG. 5. As shown in FIG. 5, a speech is input into a preprocessing module, which performs the above steps S402-S404, that is, unifies the sampling frequency, performs denoising, segmenting, and other processing on the speech. Then, the processed speech segment is input into an SI-ASR system, which performs the processing of step S405, that is, converts the speech segment into a PPG signal.

2. In Terms of Processing for the Image Segment

Since the image segment includes a personal feature of a target character, such as lip thickness, mouth size, etc. Therefore, before the image segment is input into the visual neural network to obtain the image feature, the personal feature of the target character in the image segment is first erased, information related to a movement of a lower half face is preserved; and then image data in which the personal feature of the target character has been erased is input into the visual neural network, thereby improving the accuracy of synchronization comparison between speeches and images.

Taking the extraction of a feature of a lower half face from the image segment as an example, the generation of a contour map of the target character based on the image segment will be explained below. The extracted contour map here is independent of the personal feature of the target character.

After acquiring the speech segment and the image segment of the video in S401, the specific steps for processing the image segment may include the following.

S406: performing facial detection on the image segment to obtain a face detection box.

Generally speaking, the facial detection is performed on each frame of image out of the image segment to obtain the face detection box.

S407: aligning a face in the face detection box horizontally.

Specifically, facial key points in the face detection box may be positionally located in the original image by using a dense face alignment algorithm, including but not limited to a position of a left eye center, a position of a right eye center, a position of a left mouth corner, and a position of a right mouth corner. The above descriptions "left" and "right" represent the left and the right in physiological meanings of the face in the image, rather than left and right in the image, and assuming that the face in the image is frontal. Using position information of the facial key points mentioned above, the facial image is processed into a rule-compliant form based on a rule from calculation. The rule here may be as follows:

- calculating a middle position between a left eye center key point and a right eye center key point, denoted as P_eyecentre;
- calculating a middle position between a left mouth corner key point and a right mouth corner key point, denoted as P_mouthcentre;
- calculating a vector from the left eye center key point to the right eye center key point, denoted as V_eyetoeye;
- calculating a vector from P_eyecentre to P_mouthcentre and rotating it 90 degrees counterclockwise to make it form a sharp angle with V_eyetoeye, denoted as V_eyetomouth;
- calculating a vector difference between V_eyetoeye and V_eyetomouth, and normalizing the vector difference to obtain a unit vector X_unit;
- magnifing X unit with a magnification factor, where the magnification factor is a maximum of 2 times of a module of V_eyetoeye and 1.8 times of a module of V2_eyetomouth, to obtain a vector X, and rotating X 90 degrees counterclockwise to obtain a vector Y;
- obtaining, with P_eyecentre moving 0.1 times V_eyetomouth as a center C, a rectangle in the image, where a coordinate of an upper left corner of the rectangle is C+X+Y, and a coordinate of a lower right corner is C−X−Y;
- extracting, using an interpolation algorithm, an image within the rectangle and scaling the image to a predetermined size, such as 256*256 pixels, to obtain an aligned face.

The dense face alignment algorithm used here to identify facial key points may be the three-dimensional dense face alignment (3 Dimensional Dense Face Alignment, 3DDFA) algorithm. Of course, other alignment algorithms may also be used to obtain the facial key points, and then the above rules may be used to achieve face alignment. There is no restriction on the specific algorithms used here.

Compared to a more commonly used method of aligning a face through calculation of affine transformation between facial key points and a preset facial key point template for a frontal face, this method can be compatible with alignment of large angle side faces and frontal faces.

S408: extracting an expression coefficient of the target character from the face.

Specifically, the expression coefficient of the target character in the face detection box may be extracted through a three-dimensional morphable model (three-dimensional Morphable Models, 3DMM) parameter estimation algorithm, where the expression coefficient meets a standard of the three-dimensional morphable model. Since decoupling of an identity parameter space (the part expressing identity information) and an expression parameter space (the part expressing expression information) is explicitly designed for the 3DMM, the expression information obtained through the 3DMM parameter estimation algorithm does not include identity information, that is, the personal feature.

By taking the content in the face detection box as an input and using the 3DMM parameter estimation algorithm to process the content in the face detection box, an identity coefficient and the expression coefficient of the target character that meet the standard of the 3DMM can be acquired, and the expression coefficient is denoted as $a_{exp}$.

Among them, the 3DMM parameter estimation algorithm is an algorithm through which parameters of the 3DMM can be estimated, for estimating an identity coefficient and an expression coefficient of a face, where the identity coefficient and the expression coefficient meet the standard defined by the 3DMM.

Specifically, the 3DMM parameter estimation algorithm used in the application is implemented using a deep neural network model. A pre-trained deep neural network model may be used to input an aligned facial image in a face detection box and an identity coefficient corresponding to a target character in the related art into the model, extract an expression coefficient and an identity coefficient of the target character in the aligned facial image, and update the identity coefficient corresponding to the target character in the related art based on the output identity coefficient for subsequent image frame estimation. The identity coefficient corresponding to the target character here is a sliding weighted average of estimated identity coefficients of temporally adjacent image frames.

Compared to directly calculating an expression coefficient of the target character from the aligned facial image alone, by inputting calculation results of the identity coefficients of the target character from temporally adjacent image frames into the deep neural network model, the model may better use the expression coefficient instead of changing the identity coefficient to fit the morphological changes of the face; that is, by introducing the constraint of temporal stability for the identity coefficient to eliminate ambiguity in the parameter estimation process, thereby obtaining a more accurate expression coefficient.

Similarly, it is also possible here to refer to other 3DMM parameter estimation algorithms for which identity coefficients can be stabilized to obtain an expression coefficient of each frame, such as the Face2Face algorithm (Thies, Justus, et al., Face2Face: Real time face capture and reenactment of rgb videos, Proceedings of the IEEE conference on computer vision and pattern recognition. 2016 (Thies, Justus, et al., "Face2face: Real-time face capture and reenactment of rgb videos", Proceedings of the IEEE conference on computer vision and pattern recognition. 2016)).

The expression coefficient $\alpha_{exp}$ includes features unrelated to the speaker, such as features that represent a position of a mouth, a degree of opening and closing of the mouth, and the like. While a feature related to the speaker is represented in the identity coefficient. Therefore, only the expression coefficient $\alpha_{exp}$ and a standard identity coefficient (where the standard identity coefficient is used here instead of the identity coefficient of the target character, to remove the personal feature of the target character) are input into a general parameterized facial model to generate a facial contour map of the target character, which can exclude the personal feature of the target character, thereby improving the accuracy of synchronicity measurement between a mouth movement and a speech.

S409: extracting a lower half-face expression coefficient corresponding to a lower half face in the expression coefficient.

Under the definition of the 3DMM, all expression coefficients have a full face effect, with some having a significant impact on a mouth and negligible impact on eyes. Therefore, the expression coefficient(s) that is(are) highly correlated with a movement of the lower half face is(are) extracted as the expression coefficient(s) of the lower half face.

For measuring the synchronicity between a certain part of the target character in the image and the speech, a coefficient unrelated to a personal feature of the target character in that part needs to be extracted from the system. Here, it is necessary to measure synchronicity between a movement of the lower half face and the speech, the expression coefficient of the lower half face is extracted from the expression coefficient, denoted as $a_{halfface}$, and then a contour map of the lower half face is generated based on the expression coefficient of the lower half face, for measurement of synchronicity with the speech.

S410: inputting the lower half-face expression coefficient into the universal three-dimensional facial model to obtain a three-dimensional facial model corresponding to the lower half face of the target character.

The three-dimensional facial model corresponding to the lower half face of the target character is a three-dimensional facial model that combines the expression coefficient of the lower half face of the target character with the standard identity coefficient.

The universal three-dimensional facial model is an abstract facial model. In the universal three-dimensional facial model, data of eyebrows, eyes, a nose, a face, a mouth, and other parts are obtained based on an average of numerous faces, and is thus universal.

After inputting the lower half-face expression coefficient into the universal three-dimensional facial model, a mouth expression of the target character is obtained, that is the three-dimensional facial model corresponding to the lower half face of the target character.

Specifically, in the universal three-dimensional facial model, a predefined complete expression orthogonal base $B_{exp}$ is correspondingly transformed to $B_{halfface}$ related to a movement of the lower half face. As shown in equation (1):

$$S=\overline{S}+B_{halfface}*a_{halfface} \quad (1)$$

Among them, S is a geometric model of a mouth shape of the target character under a neutral expression, and $\overline{S}$ is an average facial geometric model corresponding to a predefined neutral expression, $B_{halfface}$ is an orthogonal base related to a movement of a mouth, and $a_{halfface}$ is the lower half-face expression coefficient.

In this way, in the obtained three-dimensional facial model corresponding to an expression of the lower half face of the target character, an influence of irrelevant expressions can be eliminated.

S411: acquiring a vertex set of the lower half face in the three-dimensional facial model.

Figure 6:
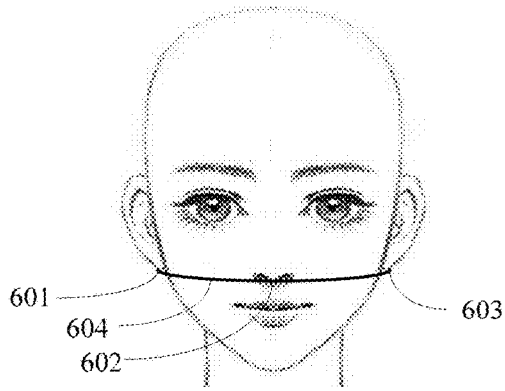
FIG. 6 is a schematic diagram of a range of a lower half face in an embodiment of the application.

The so-called lower half face refers to an area of the face below a line connecting bottoms of a left ear and a right ear and a tip of a nose. FIG. 6 is a schematic diagram of a range of a lower half face in an embodiment of the application. As shown in FIG. 6, a position 601 at a bottom of a left ear, a position 602 at a tip of a nose, and a position 603 at a bottom of a right ear are connected to obtain a connecting line 604. The connecting line 604 divides the face into an upper half face and a lower half face. The face below the connecting line 604 is the lower half face.

When selecting the lower half face, a certain amplitude of adjustment may be given to the connecting line 604, for example, moving up to a position of an eye or down to a position of a nose. That is, the selection of the lower half face may be adjusted according to actual needs.

S412: projecting the vertex set onto a two-dimensional plane to obtain a lower half-face contour map of the target character, and taking the lower half-face contour map as the facial contour map of the target character.

Specifically, vertexes corresponding to a mouth contour and a chin area on the obtained geometric model S are collected, to obtain a vertex set V. Then, the vertex set V is projected, using scale orthographic projects (Scale Orthographic Projects), onto a two-dimensional plane to obtain the contour map I of the lower half face, as shown in equation (2):

$$I=f*P*S(V),\forall v\in V \quad (2)$$

Among them, I is a two-dimensional contour map of the lower half face of the target character, f is a scale coefficient, P is an orthogonal projection matrix, and S(v) is a vertex set of the lower half face in the three-dimensional facial model. Here, a size of the contour map I may be a rectangle of 128×256, with contours of the mouth and the lower half face centered. Specifically, in order to enhance the visibility of the contour map, during projecting, each vertex is projected into a two-dimensional Gaussian circular spot with a radius of r pixels centered on the projection position of the vertex. A value of the radius r is positively correlated with a size of I, corresponding to I of 128×256, r=2 pixels here.

In the process of processing the image segment, original pose orientation and lighting information of the input facial image are not retained. Instead, only the expression coefficient of the target character in the image segment obtained through the 3DMM parameter estimation algorithm is retained. Then, combined with the standard identity coefficient, a universal three-dimensional facial model is obtained, and the contour map of the lower half face is generated, in which the personal feature of the target character is eliminated. Thus, the obtained contour map is a contour map from the perspective of a feature of a front face, in which the influence of facial posture, lighting, and occlusion in the original image are eliminated.

Figure 7:
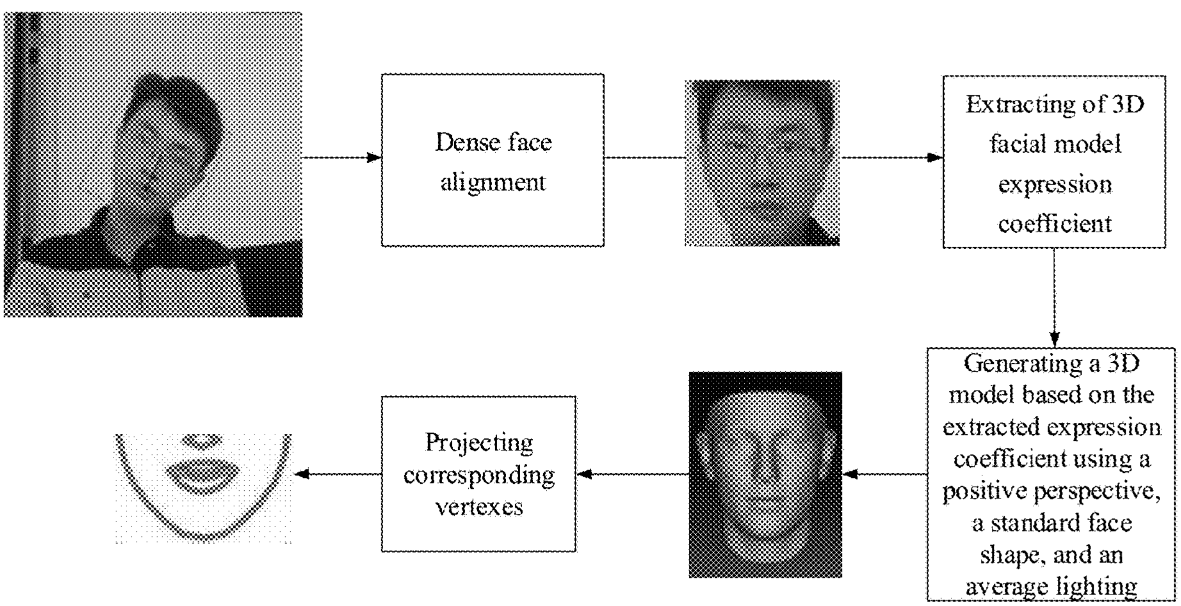
FIG. 7 is a flowchart of a process for processing an image segment in an embodiment of the application.

The above processing process may be carried out through the flowchart shown in FIG. 7. As shown in FIG. 7, steps S406-S407 are first performed on an image segment, that is, dense face alignment is performed on the image to obtain an aligned image. Then, steps S408-S409 are performed on the aligned image, that is, an expression coefficient of the 3D facial model is extracted from the aligned image. Next, step S410 is performed on the extracted expression coefficient, that is, a 3D model is generated based on the extracted expression coefficient using a positive perspective, a standard face shape, and an average lighting. Finally, steps S411-S412 are performed on the generated 3D model, that is, the corresponding vertexes of the 3D model are projected to obtain a two-dimensional contour of the lower half face.

After processing the speech segment as a PPG signal and the image segment as a two-dimensional contour map of a lower half of a front face, the PPG signal may be input into the speech neural network, and the two-dimensional contour map may be input into the visual neural network, to obtain a speech feature and a visual feature, respectively. Then, the speech feature and the visual feature may be compared to determine whether there is synchronicity between the speech segment and the image segment.

S413: obtaining, through a speech neural network, a speech feature of the specific signal.

The speech segment is input into the speech neural network through which the speech segment is processed, and an output of the speech neural network is the speech feature.

The speech neural network here may be any type of neural network that can obtain a speech feature from a speech segment. There is no specific restriction here on the specific type of the speech neural network.

S414: obtaining, through a visual neural network, a visual feature of a facial contour map.

The contour map obtained from processing the image segment is input into the visual neural network through which the contour map is processed, and an output of the visual neural network is the visual feature.

The visual neural network here may be any type of neural network that can obtain a visual feature from an image segment. There is no specific restriction here on the specific type of the visual neural network.

After obtaining the speech feature and the visual feature through speech segment processing and image segment processing, step S415 is further included: determining, according to the speech feature and the visual feature, whether there is synchronicity between the speech segment and the image segment.

An embodiment of the application further provides a method for training a model for measuring speech-image synchronicity. In such method, when training the model for measuring speech-image synchronicity, various types of training samples are acquired in advance, that is, a variety of training samples are acquired, such as an image segment and a speech segment with synchronicity in the same training video, an image segment and a speech segment without synchronicity in the same training video, an image segment and a speech segment from different training videos, and so on. The model for measuring speech-image synchronicity is trained by using multiple types of training samples, which can improve the precision of the model for measuring speech-image synchronicity, thereby improving the accuracy of measurement of speech-image synchronicity.

It should be noted that all training videos are from a training video set, and the number of training videos may be one or multiple. There is no limit on the number of training videos here. A first training video is a training video in the training video set. A training video that is different from the first training video may be selected from the training video set as a second training video.

In a practical application, the method provided in the embodiments of the application may be applied in various scenarios where it is necessary to determine whether there is speech-image synchronicity. The following three specific scenarios are used as examples for further explaining the method provided in the embodiments of the application.

Scenario 1: Speaker Determination.

When there are multiple people talking in a video, in order to determine a speaker who is currently speaking, a corresponding speech segment and a corresponding image segment are first extracted from the video; then the speech segment is processed into a PPG signal, to erase a personal feature of the speaker, such as a timbre and an intonation, and an expression coefficient is extracted from the image segment through a 3DMM parameter estimation algorithm, to generate a two-dimensional contour map of a lower half of a front face, eliminating interference from a side face, an occlusion, and other situations, where there are as many two-dimensional contour maps as individual faces in the image; next, speech data obtained from processing the speech segment is input into a speech neural network, and image data obtained from processing the image segment is input into a visual neural network, to obtain a speech feature and multiple visual features, respectively; finally, synchronicity matching is performed on the multiple visual features and the speech feature so that a visual feature having the highest synchronicity with the speech feature is determined, and the determined visual feature is compared with a preset threshold, if it belongs to a visual feature corresponding to the preset threshold, a person corresponding to the visual feature is determined as the current speaker in the video. In this way, it is possible to avoid the circumstance that a speaker who is not in the video is determined as the current speaker in the video, e.g., in a journalist interview scenario, if the journalist is not in the video screen, then there would be no corresponding speaker in the video screen when the journalist is speaking.

Scenario 2: Counterfeit Video Identification.

Sounds or images in certain videos may not be original, but artificially added in later stages. For example, re-dubbing videos of some celebrities and adding words that the celebrities never said. For another example, in some interactive live authentication, a user needs to read words displayed on a screen and then records them into a video for uploading. However, in order to pass the authentication, a criminal obtains an image of the user in advance, then dubs the image and creates a video for uploading.

In order to determine whether the video is a counterfeit, a corresponding speech segment and a corresponding image segment are first extracted from the video; then the speech segment is processed into a PPG signal, to erase a personal feature of the speaker, such as a timbre and an intonation, and an expression coefficient is extracted from the image segment through a 3DMM parameter estimation algorithm, to generate a two-dimensional contour map of a lower half of a front face, eliminating interference from a side face, an occlusion, and other situations; next, speech data obtained from processing the speech segment is input into a speech neural network, and image data obtained from processing the image segment is input into a visual neural network, to obtain a speech feature and a visual feature, respectively; finally, synchronicity matching is performed on the speech feature and the visual feature, a higher matching degree indicates that the image and speech in the video are synchronized, rather than being artificially added later on. When the matching degree is higher than a specific value, it can be determined that the image and speech in the video are generated by the same person simultaneously, that is, the speech segment in the video belongs to a character in the image segment.

Scenario 3: Video Modulation.

Some non-professional multimedia devices often have separate devices for capturing a speech and an image when recording a video. The speech may be captured using a microphone, and the image may be captured using a camera. Then, the captured speech and image are fused into a video. In this way, it is easy to cause the speech and the image in the video to be misaligned in time, that is, audio and visual asynchronicity.

In order to solve the problem of audio and visual asynchronicity in a video, a corresponding speech segment and a corresponding image segment are first extracted from the video; then the speech segment is processed into a PPG signal, to erase a personal feature of the speaker, such as a timbre and an intonation, and an expression coefficient is extracted from the image segment through a 3DMM parameter estimation algorithm, to generate a two-dimensional contour map of a lower half of a front face, eliminating interference from a side face, an occlusion, and other situations; next, speech data obtained from processing the speech segment is input into a speech neural network, and image data obtained from processing the image segment is input into a visual neural network, to obtain a speech feature and a visual feature respectively; finally, synchronicity matching is performed on the speech feature and the visual feature to determine a degree of misalignment between the speech and the image, so as to perform auxiliary calibration, so that misalignment can be eliminated by temporally aligning the speech and the image based on the calibration.

To address the issues in the three scenarios mentioned above, a pre-trained model for measuring speech-image synchronicity can be used to determine whether there is speech-image synchronicity. In related art, sample video data is first obtained, and the model for measuring speech-image synchronicity is trained based on the sample video data. The sampling of the sample video data has a significant impact on the performance such as the training efficiency and accuracy of the model for measuring speech-image synchronicity.

When training the model for measuring speech-image synchronicity, a sampling strategy of the sample video data may be optimized based on characteristics of the sample video data, so as to train the model for measuring speech-image synchronicity more efficiently and obtain a model with a higher accuracy. Specifically, the sample video data is processed through image preprocessing and speech preprocessing, contrapuntally erasing information unrelated to a speaker/target character from the sample video data and retaining information related to the speaker/target character. The speech preprocessing may specifically involve processing a speech segment extracted from the sample video data into a PPG signal, the PPG signal is regarded as a frame level structure that is independent of a language of a speaker and can be used for synchronicity judgment in multiple languages. Moreover, the PPG signal may measure a distance and may be used for sampling positive sample(s) and negative sample(s) in the sample video data. The image preprocessing may specifically involve processing an image segment extracted from the sample video data into a contour map unrelated to a personal feature of a target character. By sampling in the above way, it is easy to measure data differences using data formats obtained from the speech preprocessing and the image preprocessing, and thus the sample video data can be efficiently constructed.

Figure 8:
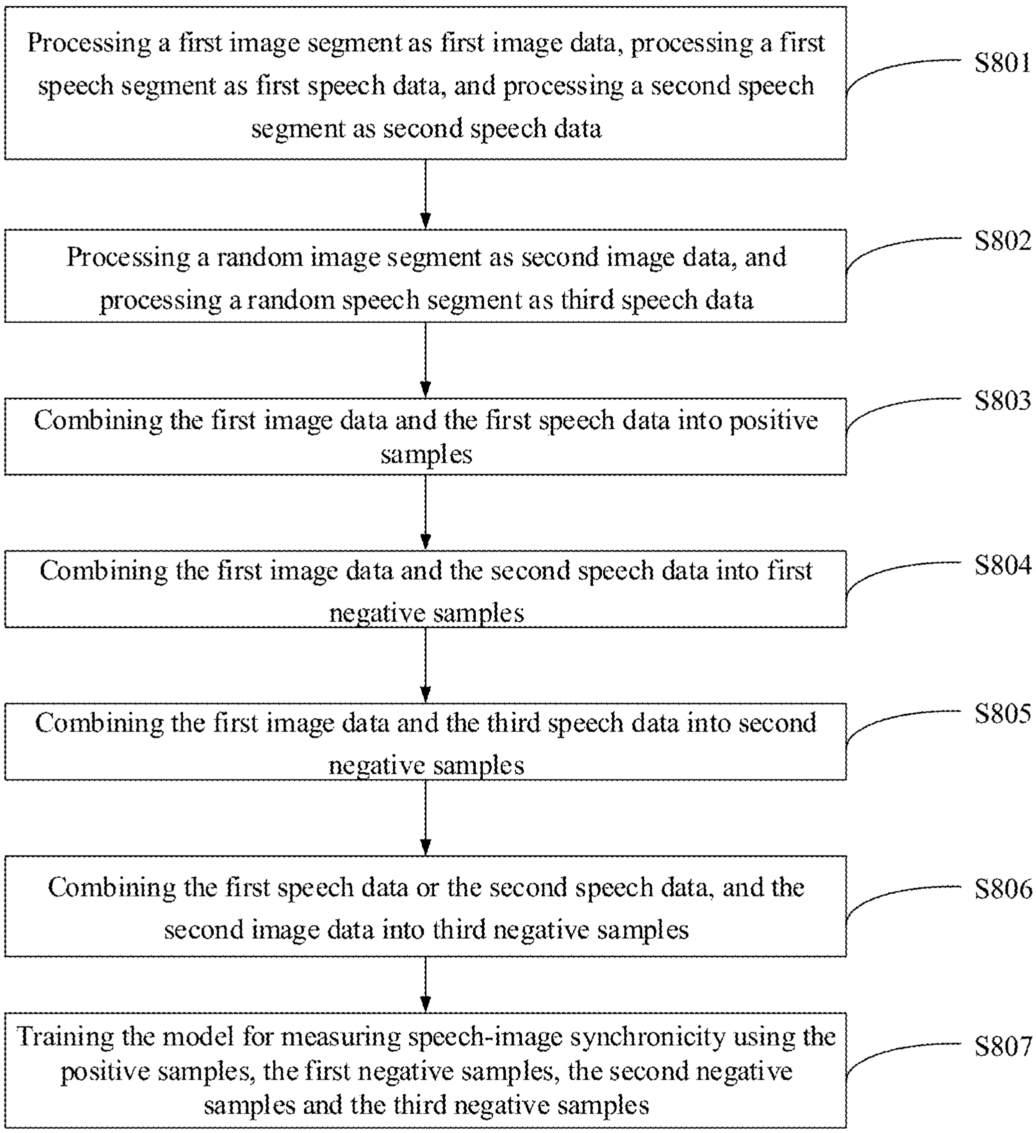
FIG. 8 is a flowchart of a method for training a model for measuring speech-image synchronicity in an embodiment of the application.

FIG. 8 is a flowchart of a method for training a model for measuring speech-image synchronicity in an embodiment of the application. As shown in FIG. 8, the method may include the following.

S801: processing a first image segment as first image data, processing a first speech segment as first speech data, and processing a second speech segment as second speech data.

Among them, the first image segment, the first speech segment, and the second speech segment are from a first training video, where there is synchronicity between the first image segment and the first speech segment, and there is no synchronicity between the first image segment and the second speech segment. That is to say, the first image data, the first speech data, and the second speech data are from the first training video.

Specifically, an image segment and a speech segment of a first interval of the first training video are acquired, to obtain the first image segment and the first speech segment. A speech segment of a second interval of the first training video is acquired, to obtain the second speech segment. Here, the first interval and the second interval may be completely non-overlapping or partially overlapping. This can ensure that there are differences in terms of content between the first speech segment and the second speech segment.

For example, the images corresponding to 10 ms to 30 ms of the first training video are taken as the first image segment, the speeches corresponding to 10 ms to 30 ms of the first training video are taken as the first speech segment, and the speeches corresponding to 35 ms to 55 ms of the first training video are taken as the second speech segment.

S802: processing a random image segment as second image data, and processing a random speech segment as third speech data.

Among them, the random image segment and the random speech segment are from a second training video. That is to say, the second image data and the third speech data are from the second training video.

The first training video and the second training video are two different videos, both of them are from a training video set. That is to say, in order to enrich the training samples, it is also necessary to obtain image segments and speech segments from other videos except the first training video, which are called random image segments and random speech segments, respectively.

It should be noted that it is necessary to keep a certain degree of difference between the first training video and the second training video in terms of specific contents of images or speeches, so that the model for measuring speech-image synchronicity can subsequently learn more accurately, thereby improving the accuracy of measurement of speech-image synchronicity.

S803: combining the first image data and the first speech data into positive samples.

In order to train the model for measuring speech-image synchronicity, it is necessary to obtain training samples. In order to further improve the accuracy of the trained model for measuring speech-image synchronicity, it is necessary to obtain various types of training samples. That is to say, it is not only necessary to obtain image segments and speech segments with synchronicity, but also various types of image segments and speech segments without synchronicity.

A positive sample may be acquired through the following operations: processing a first image segment and a first speech segment of the same interval of the same training video into first image data and first speech data to form the positive sample.

In the same training video, there are multiple intervals that may be independent of each other or partially overlap. Therefore, multiple positive samples may be obtained based on the same training video.

For example, first image data and first speech data corresponding to a first image segment and a first speech segment corresponding to 10 ms to 30 ms of the first training video may be taken as a positive sample. First image data and first speech data corresponding to a first image segment and a first speech segment corresponding to 40 ms to 60 ms of the first training video may be taken as another positive sample. And first image data and first speech data corresponding to a first image segment and a first speech segment corresponding to 20 ms to 40 ms of the first training video may be taken as a positive sample.

S804: combining the first image data and the second speech data into first negative samples.

S805: combining the first image data and the third speech data into second negative samples.

S806: combining the first speech data or the second speech data, and the second image data into third negative samples.

In the process of acquiring negative samples, due to the diversity of image segments and speech segments without synchronicity, various image segments and speech segments without synchronicity may be listed, to fully train the model for measuring speech-image synchronicity.

Specifically, on the basis of the first image segment of the first training video, a speech segment without synchronicity with the first image segment is preprocessed with the first image segment to form a negative sample. The speech segment without synchronicity (non-synchronized speech segment) here includes two situations.

Situation 1: the non-synchronized speech segment is also from the first training video. That is, the speech segment may be the second speech segment. At this point, the first image segment and the second speech segment may be processed into the first image data and the second speech data to form first negative samples for which speeches are misaligned with images.

Situation 2: the non-synchronized speech segment is from the second training video. That is, the speech segment may be the random speech segment. At this point, the first image segment and the random speech segment may be processed into the first image data and the third speech data to form second negative samples with fixed images.

In addition to the above two situations, there is still a situation that is based on a speech segment in the first training video rather than on the first image segment in the first training video.

Situation 3: the non-synchronized image segment is from the second training video. That is to say, the second speech segment and other image segments are processed into the second speech data and the second image data to form third negative samples with fixed speeches. Of course, the first speech segment and other image segments may be processed into the first speech data and the second image data to form third negative samples with fixed speeches, as long as the speech segment in the third negative samples are from the first training video.

In this way, the types of training samples are relatively diverse, especially the types of negative samples.

The first speech segment, the second speech segment, and the random speech segment are processed and converted into specific signals that are independent of personal features of speakers in the speech segments. That is, the first speech data, the second speech data, and the third speech data are all specific signals that are independent of personal features of speakers in their corresponding speech segments.

In a possible implementation, the first image segment and the random image segment are processed and converted into a facial contour map of a target character, which is independent of a personal feature of the target character in the image segment. The first image data and the second image data are both facial contour maps of the target character, which are independent of personal features of the target characters in the corresponding image segments.

S807: training the model for measuring speech-image synchronicity using the positive samples, the first negative samples, the second negative samples and the third negative samples.

After collecting the positive samples, the first negative samples, the second negative samples and the third negative samples, the positive samples, the first negative samples, the second negative samples and the third negative samples are input into the model for measuring speech-image synchronicity for training, that is, adjusting various parameters in the model for measuring speech-image synchronicity, optimizing the model for measuring speech-image synchronicity, so that after subsequent input of the image data and speech data to be measured, the model for measuring speech-image synchronicity can perform accurate measurement.

It should be noted that in the model for measuring speech-image synchronicity, there are mainly two neural networks, namely a speech neural network and a visual neural network. The speech neural network mainly obtains a speech feature based on speech data, while the visual neural network mainly obtains a visual feature based on image data. In addition, a synchronicity measuring module is further included, which may also be a neural network. Therefore, training the model for measuring speech-image synchronicity means training each neural network in the model for measuring speech-image synchronicity.

From the above content, in the method for training the model for measuring speech-image synchronicity provided in the embodiment of the application, after a first image segment and a first speech segment with synchronicity in a first training video, a second speech segment without synchronicity with the first image segment, and a random image segment and a random speech segment outside of the first training video are processed as first image data, first speech data, second speech data, second image data and third speech data respectively, the first image data and the first speech data are combined into positive samples, the first image data and the second speech data are combined into first negative samples, the first image data and the third speech data are combined into second negative samples, and the first speech data or the second speech data, and the second image data are combined into third negative samples. In this way, the types of training samples are enriched, especially the types of negative samples that do not have image-speech synchronicity. Therefore, the model for measuring speech-image synchronicity is trained by using the positive samples, the first negative samples, the second negative samples and the third negative samples of multiple types, thereby improving the precision of the model for measuring speech-image synchronicity, and further improving the accuracy of measurement of speech-image synchronicity.

Figure 9:
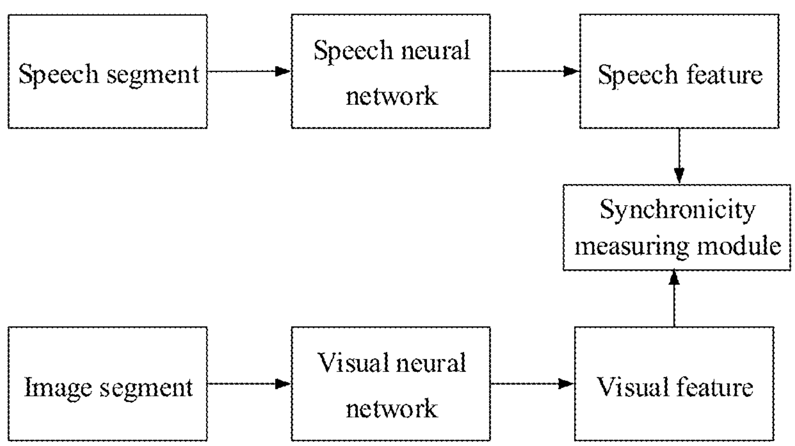
FIG. 9 is a schematic diagram of an architecture for measuring speech-image synchronicity in an embodiment of the application.

FIG. 9 is a schematic diagram of an architecture for measuring speech-image synchronicity in an embodiment of the application. As shown in FIG. 9, after extracting respectively a speech segment and an image segment from a video, on the one hand, the speech segment is input into a speech neural network to obtain a speech feature. On the other hand, the image segment is input into a visual neural network to obtain a visual feature. Finally, the speech feature and the visual feature are input into a synchronicity measuring module, which determines whether there is synchronicity between the corresponding speech segment and image segment according to the speech feature and the visual feature. The synchronicity measuring module here is a module that determines whether there is synchronicity between the corresponding speech segment and image segment by comparing the speech feature with the visual feature. The specific form of the synchronicity measuring module is not limited here.

In a practical application, in order to obtain the speech feature of the speech segment, the speech segment may be input into a speech neural network for processing, to obtain the speech feature. And, in order to obtain the visual feature of the image segment, the image segment may be input into a visual neural network for processing, to obtain the visual feature. In the following, description is made hereunder in terms of construction of neural networks, sampling of training data, and training of neural networks separately.

I. Construction of Neural Networks

1. Construction of Speech Neural Network

Before inputting the speech segment into the speech neural network, the speech segment has already been converted into a specific signal, specifically a PPG signal with a dimension of T×P. And each dimension has a clear physical meaning, where P represents the number of phonemes, T represents the number of sampling times in time, and each column represents a posterior probability distribution of phonemes corresponding to a speech frame. Based on these clear physical meanings, the speech neural network may be specifically constructed as follows.

Figure 10:
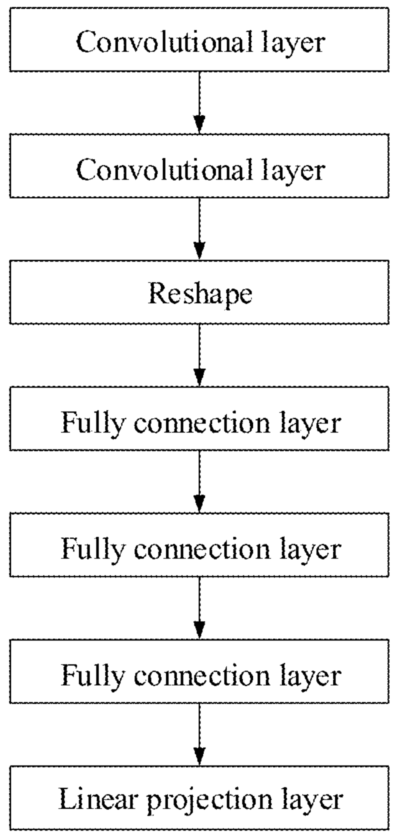
FIG. 10 is a schematic diagram of an architecture of a speech neural network in an embodiment of the application.

FIG. 10 is a schematic diagram of an architecture of a speech neural network in an embodiment of the application. As shown in FIG. 10, the speech neural network at least includes: a convolutional layer (Conv1D(3×1,stride=(2,1)) LeakyReLU(0.02)), . . . , a convolutional layer (Conv1D(3×1,stride=(2,1)) LeakyReLU(0.02)), a reshape layer (Reshape), a fully connected layer (Fully Connected Layer LeakyReLU (0.02)), a fully connected layer (Fully Connected Layer LeakyReLU (0.02)), a fully connected layer (Fully Connected Layer LeakyReLU (0.02)), and a linear projection layer (Linear Projection Layer).

Considering the overlap between adjacent speech segments, multiple one-dimensional convolutional layers (with a convolutional kernel size of 3×1, a convolution step size of (2, 1)) are used, and then valid padding (valid padding) is used to process the time dimension. An obtained matrix is reorganized into an eigenvector. Next, the eigenvector is processed by the three fully connected layers. Finally, a 512-dimensional speech eigenvector is obtained through the linear projection layer. Among them, the number of convolutional layers is related to a duration of the input specific signal (a feature matrix corresponding to the PPG signal). A dimension of a final output speech eigenvector is consistent with a dimension of a subsequent output visual eigenvector. The speech eigenvector in the embodiments of the application is also the speech feature, and the visual eigenvector is also the visual feature.

Specifically, when P=400 and input duration=200 ms, T=13, a dimension of a PPG feature matrix is 13×400. Correspondingly, two one-dimensional convolutional layers may be used to obtain a feature matrix of 3×400. After reorganizing the feature matrix into an eigenvector of 1×1200, a final 512-dimensional speech eigenvector is obtained through three fully connected layers and one linear layer.

Figure 11:
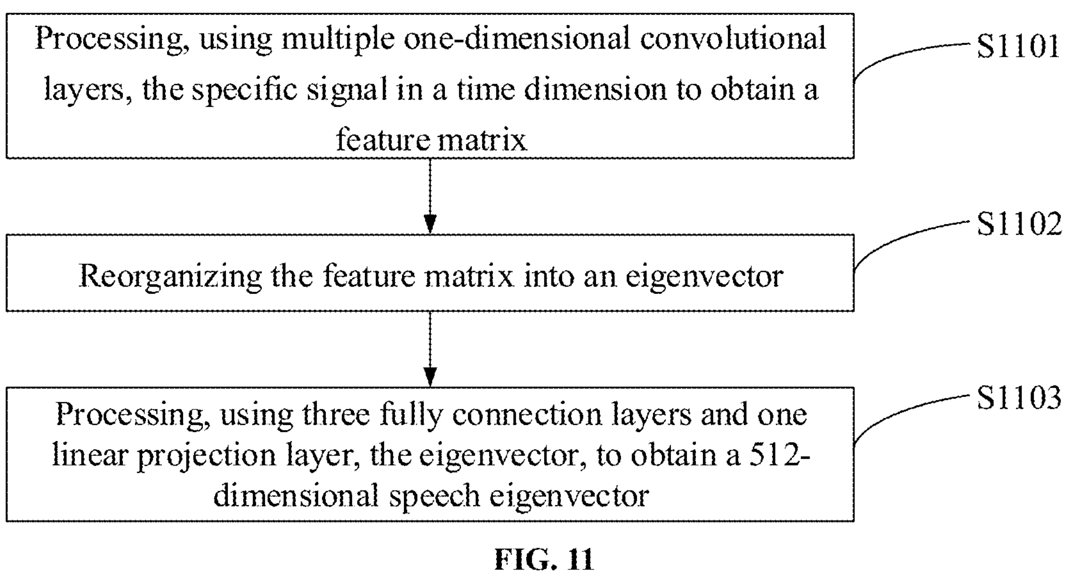
FIG. 11 is a schematic diagram of a process for generating a speech feature in an embodiment of the application.

FIG. 11 is a schematic diagram of a process for generating a speech feature in an embodiment of the application. As shown in FIG. 11, the process may include the following.

S1101: processing, using multiple one-dimensional convolutional layers, the specific signal in a time dimension to obtain a feature matrix.

Among them, the number of one-dimensional convolutional layers is related to a corresponding duration of the specific signal.

S1102: reorganizing the feature matrix into an eigenvector.

S1103: processing, using three fully connected layers and one linear projection layer, the eigenvector to obtain a 512-dimensional speech eigenvector.

Of course, the finally obtained speech eigenvector is not limited to only be 512-dimensional. The dimension of the speech eigenvector is related to an amount of speech data input into the model and a type of a loss function used by the speech neural network. The speech neural network may specifically be the speech neural network included in the model for measuring speech-image synchronicity.

2. Construction of Visual Neural Network

Due to a significant removal of factors that cause interference to movement information of a lower half face (such as lighting, a personal feature, a posture, etc.) in the image segment before inputting the image segment into the visual neural network, the visual neural network may adopt a relatively lightweight network structure with relatively low computational complexity.

Specifically, the visual neural network may adopt a backbone network of ResNet18 and make the following modifications.

(1) If the input image segment includes multiple images, the multiple images may be arranged in a chronological increasing order along the channel dimension as input to the visual neural network. Therefore, the parameter dimension of convolution in the first layer of the visual neural network needs to be adjusted accordingly.

(2) Due to the fact that the image segment is processed into a contour map of the lower half face, with a resolution of 128×256 and an aspect ratio of 1:2 which is different from a default input aspect ratio of 1:1 of ResNet18, thus, it is necessary to use a relatively large convolution kernel size in the first layer of convolution of ResNet18, such as 7×7, and a convolution step size is set as (1, 2).

The above convolution kernel size and step size are only specific numerical values, which are not intended to limit the convolution kernel size and step size used in the embodiments of the application to only 7×7 and (1, 2). In practical applications, the convolutional kernel size and step size of the convolutional layer are related to a size of the contour map. A corresponding step size may be set based on an aspect ratio of the contour map, and the convolution kernel size may be set slightly large. In this way, using a convolutional layer with a relatively large convolutional kernel may be sufficiently enough to process the contour map at a time. Of course, multiple convolutional layers with relatively small convolutional kernels may also be used for multiple times of processing to realize the same purpose.

(3) At the end of the backbone network of ResNet18, a fully connected layer is added to obtain a 512-dimensional visual eigenvector.

Of course, the finally obtained visual eigenvector is not limited to be only 512-dimensional. The dimension of the visual eigenvector is related to an amount of visual data input into the model and a type of a loss function used by the visual neural network.

Of course, in addition to using the backbone network of ResNet18, other deep neural networks may be modified and used as the visual neural network, such as MobilenetV2.

Figure 12:
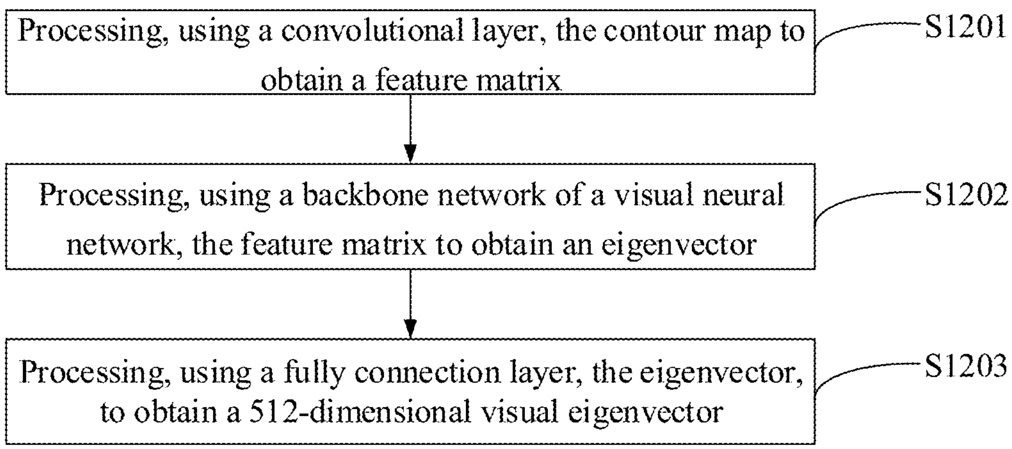
FIG. 12 is a schematic diagram of a process for generating a visual feature in an embodiment of the application.

FIG. 12 is a schematic diagram of a process for generating a visual feature in an embodiment of the application. As shown in FIG. 12, the process may include the following.

S1201: processing, using a convolutional layer, the contour map to obtain a feature matrix.

Among them, a convolutional kernel size and a step size of the convolutional layer are related to a size of the contour map.

S1202: processing, using a backbone network of a visual neural network, the feature matrix to obtain an eigenvector.

The backbone network here refers to a main architecture in a neural network. In order to construct the visual neural network in the embodiments of the application, after obtaining a certain visual neural network in the related art, the architecture of the visual neural network in the related art, namely the backbone network, is adopted, and parameters in certain layers are adaptively modified to obtain the visual neural network in the embodiments of the application. The visual neural network may specifically be the visual neural network included in the model for measuring speech-image synchronicity.

S1203: processing, using a fully connected layer, the eigenvector to obtain a 512-dimensional visual eigenvector.

II. Sampling of Training Data

For training videos, a portrait video in which a single person speaks is used. In such portrait video, an interference level of a background sound is less than a specific level. That is to say, it is necessary to use a video in which a single person speaks with a relatively clean background sound. Moreover, training videos may be in large quantities to enable more comprehensive training in the future. In a practical application, a high-definition video at 25 Hz may be used. This can improve the accuracy of extraction and training of visual features.

After collecting the training videos, an audio signal in each video is first processed into 16 kHz, and the video signal is segmented into frames, and a timeline is recorded. In this way, a speech segment and an image segment are obtained. Then, the speech segment is processed using the processing method in steps S402-S405 above to obtain a specific signal, which is referred to as speech during subsequent sampling. The image segment is processed using the processing method in steps S406-S412 above to obtain a facial contour map, which is referred to as visual during subsequent sampling.

Next, sampling may be performed on the training data formally. Here, it mainly includes sampling of positive samples and sampling of negative samples. The so-called positive sample refers to that the input speech and visual are synchronized. The so-called negative sample refers to that the input speech and visual are not synchronized. By inputting the positive samples and the negative samples for training, the accuracy of measurement of speech-image synchronicity can be improved.

1. Sampling of Positive Samples

The so-called positive sample refers to that the speech and visual used during training need to come from the same training video and are synchronized in time.

Moreover, if a length of the speech is too short, it may result in a complete pronunciation not being included in the speech, and may even affect the understanding of semantics in the speech. Therefore, in order to improve the accuracy of speech feature recognition and thus improve the accuracy of synchronicity measurement, a frame length of the speech may be greater than a frame length of the visual. The specific selection of the frame length of the speech may be determined based on a frame rate of the training video.

For example, for a training video with a frame rate of 25 Hz, a frame of image at time T and a speech segment (T−20 ms, T+20 ms) may be selected and processed to form a positive sample pair. At this point, the length of the visual is 1 frame, while a length of the speech is 40 ms. Obviously, this is to make the frame length of the speech greater than that of the visual. The length of the speech is set to 40 ms to match the frame rate of 25 Hz of the training video. If a training video with another frame rate is used, the length of the speech may be adjusted accordingly.

A training video is selected from a training video set, abbreviated as a first training video; another training video is selected from the training video set, abbreviated as a second training video. The first training video and the second training video are different training videos.

In the embodiment of the application, the first image segment and the first speech segment obtained from the first training video are processed into the first image data and the first speech data, forming positive samples.

2. Sampling of Negative Samples

The so-called negative sample refers to that the speech and visual used during training are not synchronized. The asynchrony here may include multiple situations. In order to train more fully, sampling may be performed for all asynchronous situations.

When collecting a negative sample pair, an image segment and a speech segment may be collected separately from different videos, or from different times in the same video, to form negative samples. However, there may still be a positive sample in the negative sample pair collected in this way. For example, when a speech segment of a video A is the same as a speech segment of a video B, then the speech segment of the video A and an image segment corresponding to the speech segment of the video B are also synchronized, if the speech segment of the video A and the image segment corresponding to the speech segment of the video B are composed into negative samples, in fact, the above two constitute positive samples. For another example, when a speech corresponding to a certain image segment of the video A is muted, and a speech corresponding to another image segment of the video B is also muted, if the image segment of the video A and a speech segment corresponding to the image segment of the video B are combined, in fact, positive samples are formed. In this way, unreasonable negative samples appear in the negative sample pair, thereby reducing the accuracy of training the neural network, and further reducing the accuracy of subsequent synchronicity measurement.

In view of this, in the embodiment of the application, when collecting negative samples, it is necessary to remove unreasonable negative samples, that is, clean the training database to remove negative samples that are not suitable for training. In this way, the accuracy of negative samples can be improved, thereby improving the accuracy of training the neural network and further improving the accuracy of measurement of speech-image synchronicity.

Specifically, sampling of negative samples may be carried out in the following three ways.

(1) Misaligned Negative Samples

The so-called misaligned negative samples refer to that although the speech and the visual are from the same training video, they are not synchronized in time, meaning there is a small amount of misalignment.

For example, a frame of image at time T and a speech segment (T−t−20 ms, T−t+20 ms) are collected and processed to form a negative sample pair. That is, the image segment is processed into image data, and the speech segment is processed into speech data, and then a sample pair <speech data, image data> is constructed, abbreviated as <speech, visual>.

For example, for misaligned negative samples: <speech, visual> negative samples are taken from the same video, with a small amount of timeline misalignment. A frame of image at time T and a speech segment (T−t−20 ms, T−t+20 ms) form the negative sample pair, where |t|>80 ms. That is, the speech and the visual need to be misaligned for at least 80 ms, more than a time duration corresponding to two frames of images to make them qualified as a negative sample pair. And it is also necessary to ensure that the speech segment (T−20 ms, T+20 ms) differs from the speech segment (T−t−20 ms, T−t+20 ms) in terms of semantics.

Specifically, when constructing the misaligned negative samples, a misalignment duration between the speech and the visual needs to be greater than or equal to twice a duration of the visual. This ensures that the speech in the misaligned negative samples is completely misaligned from a synchronized speech corresponding to the visual in the misaligned negative samples, thereby ensuring the accuracy of subsequent training.

If other frame rates are used for a training video, a frame length of the speech may be adjusted accordingly, and a frame length of the visual may also be adjusted accordingly.

In addition, in order to further improve the accuracy of subsequent training, it is also necessary to ensure that the speech in the misaligned negative samples differs from a synchronized speech corresponding to the visual in the misaligned negative samples in terms of semantics.

After obtaining the misaligned negative samples, the misaligned negative samples are taken as candidate negative samples, and visual rule judgment and speech rule judgment described below are performed, to obtain first negative samples.

(2) Negative Sample with Fixed Speech

The so-called negative sample with fixed speech refers to that the speech is extracted from the same training video, while the visual is randomly extracted from a further training video other than such training video. However, the speech in the above further training video differs from the speech extracted from the above same training video in terms of semantics.

For example, for negative samples with fixed speech segment: the negative samples <speech, visual> are collected from different videos, where the speech segment is fixed and a frame of image is randomly sampled from another training video, to form a negative sample pair. Among them, it is necessary to ensure that the speech in the negative sample pair differs from a speech in a positive sample pair to which the visual belongs in terms of semantics. If the semantics of the speech in the negative sample pair is "muted", then the semantics of the speech in the positive sample pair to which the visual of the negative sample pair belongs cannot be "muted".

After obtaining the negative samples with fixed speech, the negative samples with fixed speech are taken as candidate negative samples, and visual rule judgment and speech rule judgment described below are performed, to obtain second negative samples.

(3) Negative Sample with Fixed Visual

The so-called negative sample with fixed visual refers to that the visual is extracted from the same training video, while the speech is randomly extracted from a further training video other than such training video. However, the visual in the above further training video differs from the visual extracted from the same training video in terms of a movement of a lower half face of a character in the image.

For example, for negative samples with fixed visual frame: the negative samples <speech, visual> are collected from different videos, where a video frame is fixed, and a speech segment is randomly sampled from other videos to form a negative sample pair. Among them, it is necessary to ensure that for the video frame in the negative sample pair and a visual image in a positive sample pair to which the speech segment belongs, there is a sufficient difference in a movement of a lower half face.

After obtaining the negative samples with fixed visual, the negative samples with fixed visual are taken as candidate negative samples, and visual rule judgment and speech rule judgment described below are performed, to obtain third negative samples.

The above first image segment and the random image segment are both images from one or more consecutive time points.

In addition, in a practical application, considering that a single frame of image does not have contextual information, it is thus not possible to fully express movement information of a lower half face of a character in the image. Therefore, during sampling, images at T consecutive time points may be collected to obtain the visual, and speech segments corresponding to the images at T time points are collected to obtain the speeches. The obtained visual and the speeches are then processed to form sample pairs, and the sample pairs are input into the neural network for training. Generally speaking, T may be set to 5, and a corresponding speech segment is 200 ms.

After obtaining the three types of samples mentioned above as candidate negative samples, visual rule judgment and speech rule judgment are required for all the three types of candidate negative samples, and only candidate negative samples that pass both judgments are retained as qualified negative samples. The specific judgment process is as follows.

1) Speech Rule Judgment

Judging negative samples <speech a, visual v>, where the speech a needs to differ from a speech a_positive in a positive sample pair to which the visual v belongs in terms of semantics.

Specifically, the core idea is to measure a difference between PPG feature sequences, that is, for candidate negative samples, the speech rule judgment refers to determining whether an editing distance between two phoneme sequences corresponding to the speech in the negative samples and a speech in a positive sample pair to which the visual in the negative samples belongs is greater than a preset threshold.

Since the speech sample has been processed into a PPG feature sequence, each PPG feature is a posterior probability distribution of phonemes included in a corresponding speech frame. Therefore, by taking a maximum probability of the posterior probability distribution, the phonemes corresponding to the speech frame may be obtained, thus the PPG feature sequence may be converted into a phoneme sequence $P=[p_0 \ldots p_i \ldots p_t]$.

After obtaining phoneme sequences of the speech a in the negative samples and the speech a_positive in the corresponding positive samples, an editing distance between the two phoneme sequences is calculated. Specifically, an editing distance $D=L(P_1,P_2)$ between a phoneme sequence $P_1$ in the negative samples and a phoneme sequence $P_2$ in the corresponding positive samples may be calculated through the Levenshtein Distance (Levenshtein Distance). That is, how many steps are required for converting $P_1$ ti $P_2$ by performing deletion, insertion, and replacement operations, and sequences with higher similarity require fewer steps. When a value of D is less than a preset threshold, it is determined that the two speech samples are too similar; while when the value of D is greater than the preset threshold, it is determined that there is a sufficient difference between the two speech samples. The preset threshold may be obtained from statistics of a database. The database may include multiple sets of manually labeled similar speech sample pairs and multiple sets of manually labeled speech sample pairs with sufficient differences. By conducting histogram statistics on editing distances of the two types of manually labeled data, a boundary value of editing distances which minimizes confusion is determined as the preset threshold.

2) Visual Rule Judgment

Judging negative samples <speech a, visual v>, where the visual v needs to sufficiently differ from a visual v_positive in a positive sample pair to which the speech a belongs in terms of a movement of a lower half face.

Specifically, the core idea is to determine a similarity between the visual in the negative sample and the visual in a corresponding positive sample, that is, for a candidate negative sample, the visual rule judgment is to judge whether a similarity difference between the visual in the candidate negative sample and the visual in a corresponding positive sample is greater than a preset threshold, the preset threshold may be selected according to actual needs.

Since the above two visual samples have been preprocessed, both of them have been processed into contour maps of lower half faces, and have been aligned due to the use of the same standard identity information and projection coordinate system. Therefore, a threshold may be used to transform the two contour maps from grayscale images of 0-255 to binary contour maps of 0/1, denoted as $M_{v1}$ and $M_{v2}$.

Then, an absolute difference $D_1=\Sigma|M_{v1}-M_{v2}|$ between the two binary contour maps is calculated, and a structural similarity (Structural Similarity, SSIM) $D_2=SSIM(M_{v1},M_{v2})$ between the two binary contour maps is calculated, and then a weighted sum $D=\lambda_1 D_1+\lambda_2 D_2$ is obtained for these two. When a value of D is below a preset threshold, it is determined that the two visual samples are too similar; while when the value of D is higher than the preset threshold, it is determined that there is a sufficient difference between the two visual samples. The weights $\lambda_1$, $\lambda_2$ and the preset threshold may be obtained from statistics of a database. The database may include multiple sets of manually labeled similar visual sample pairs and multiple sets of manually labeled visual sample pairs with sufficient differences. By conducting histogram statistics on weighted values of absolute differences and structural similarities between two types of manually labeled data, the weighted weights may be adjusted to determine final weights that minimize confusion between the two types of manually labeled data, and a boundary value of the weighted weights that minimize confusion is determined as the preset threshold.

When each visual sample includes images from T consecutive time points, the T frames of images are preprocessed, and differences between corresponding frames between the two visual samples are judged one by one according to the above visual rule. Then, based on a ratio of the number of frames with differences to the total number of frames in the visual sample, the final judgment is made. If the ratio is higher than a preset threshold, it is determined that there is a sufficient difference between the two visual samples.

The above dual judgment of both visual rule judgment and speech rule judgment is very important, as many words (characters) with different pronunciations have very similar mouth movements. For example, both of "Yu" in "TiYu" and "Chu" in "ChuMen" include a mouth movement of pouting. Therefore, only negative samples that pass the dual judgment are considered as reasonable negative samples and can be used for subsequent training of the neural network. In this way, the accuracy of training a neural network can be improved, thereby improving the accuracy of measurement of speech-image synchronicity.

After screening these three types of candidate negative samples, the first negative samples, the second negative samples and the third negative samples are obtained, and then the first negative samples, the second negative samples and the third negative samples are used for training the neural network.

Specifically, when it is determined that speech data corresponding to first image data differs from second speech data in terms of their phonetic posterior grams PPG, and the first image data differs from image data corresponding to the second speech data in terms of their movements of lower half faces, the first image data and the second speech data are composed into a first negative sample. When it is determined that speech data corresponding to first image data differs from third speech data in terms of their phonetic posterior grams, and the first image data differs from image data corresponding to the third speech data in terms of their movements of lower half faces, the first image data and the third speech data are composed into a second negative sample. When it is determined that speech data corresponding to second image data differs from first speech data or second speech data in terms of their phonetic posterior grams, and the second image data differs from image data corresponding to the first speech data or the second speech data in terms of their movements of lower half faces, the first speech data or the second speech data, and the second image data are composed into a third negative sample. Among them, the speech data corresponding to the first image data refers to speech data in a positive sample pair to which the first image data belongs, the speech data corresponding to the second image data refers to speech data in a positive sample pair to which the second image data belongs, the image data corresponding to the first speech data refers to image data in a positive sample pair to which the first speech data belongs, the image data corresponding to the second speech data refers to image data in a positive sample pair to which the second speech data belongs, and the image data corresponding to the third speech data refers to image data in a positive sample pair to which the third speech data belongs.

Taking the composing of the first negative sample as an example, the above misaligned negative sample is used as a candidate negative sample for speech rule judgment, that is, determining whether second speech data corresponding to the second speech segment differs from a speech in a positive sample pair to which first image data corresponding to the first image segment belongs in terms of their phonetic posterior grams, that is, whether an editing distance between phoneme sequences corresponding to these two is greater than a preset threshold. If the editing distance is greater than the preset threshold, it indicates that these two are different in terms of their phonetic posterior grams. In addition, the above misaligned negative sample also needs to be used as a candidate negative sample for visual rule judgment, that is, determining whether a similarity difference between the first image data corresponding to the first image segment and image data in a positive sample pair to which the second speech data corresponding to the second speech segment belongs is greater than a preset threshold. If the similarity difference is greater than the preset threshold, it indicates that these two are different. When it is determined that the second speech data differs from the speech in the positive sample pair to which the first image data belongs in terms of their phonetic posterior grams, and the similarity difference between the first image data and the image data in the positive sample pair to which the second speech data belongs is greater than the preset threshold, the first image data and the second speech data are composed into the first negative samples.

Taking the composing of the second negative sample as an example, the above negative sample with fixed speech is used as a candidate negative sample for speech rule judgment, that is, determining whether third speech data corresponding to the third speech segment differs from a speech in a positive sample pair to which first image data corresponding to the first image segment belongs in terms of their phonetic posterior grams, that is, whether an editing distance between phoneme sequences corresponding to these two is greater than a preset threshold. If the editing distance is greater than the preset threshold, it indicates that these two are different in terms of their phonetic posterior grams. In addition, the above negative sample with fixed speech also needs to be used as a candidate negative sample for visual rule judgment, that is, determining whether a similarity difference between the first image data corresponding to the first image segment and image data in a positive sample pair to which the third speech data corresponding to the third speech segment belongs is greater than a preset threshold. If the similarity difference is greater than the preset threshold, it indicates that these two are different. When it is determined that the third speech data differs from the speech in the positive sample pair to which the first image data belongs in terms of their phonetic posterior grams, and the similarity difference between the first image data and the image data in the positive sample pair to which the third speech data belongs is greater than the preset threshold, the first image data and the third speech data are composed into the second negative samples.

Taking the composing of the third negative sample as an example, the above negative sample with fixed visual is used as a candidate negative sample for speech rule judgment, that is, determining whether first/second speech data corresponding to the first/second speech segment differs from a speech in a positive sample pair to which second image data corresponding to the second image segment belongs in terms of their phonetic posterior grams, that is, whether an editing distance between phoneme sequences corresponding to these two is greater than a preset threshold. If the editing distance is greater than the preset threshold, it indicates that these two are different in terms of their phonetic posterior grams. In addition, the above negative sample with fixed visual also needs to be used as a candidate negative sample for visual rule judgment, that is, determining whether a similarity difference between the second image data corresponding to the second image segment and image data in a positive sample pair to which the first/second speech data corresponding to the first/second speech segment belongs is greater than a preset threshold. If the similarity difference is greater than the preset threshold, it indicates that these two are different. When it is determined that the first/second speech data differs from the speech in the positive sample pair to which the second image data belongs in terms of their phonetic posterior grams, and the similarity difference between the second image data and the image data in the positive sample pair to which the first/second speech data belongs is greater than the preset threshold, the second image data and the first/second speech data are composed into the third negative samples. By constructing sample pairs in the above way, it is possible to avoid introducing an incorrect negative sample pair and achieve the mining of a hard sample pair, thereby improving the precision of the model for measuring speech-image synchronicity, and further improving the accuracy of measurement of speech-image synchronicity. In addition, it is easy to measure data differences using data formats corresponding to the speech signal and the contour map obtained by processing the speech data and the image data, thereby achieving efficient sample pair construction.

III. Training of Neural Networks

On the basis of the architecture diagram shown in FIG. 9, although it is a schematic diagram of an architecture for measuring speech-image synchronicity, the model for measuring speech-image synchronicity can also be trained based on such architecture. For example, by inputting the positive samples, the first negative samples, the second negative samples and the third negative samples collected above into the model for measuring speech-image synchronicity for training, various parameters of the model for measuring speech-image synchronicity may be adjusted, thereby improving the accuracy of measurement of speech-image synchronicity.

Here, the model for measuring speech-image synchronicity includes a speech neural network, a visual neural network, and a synchronicity measuring model.

Figure 13:
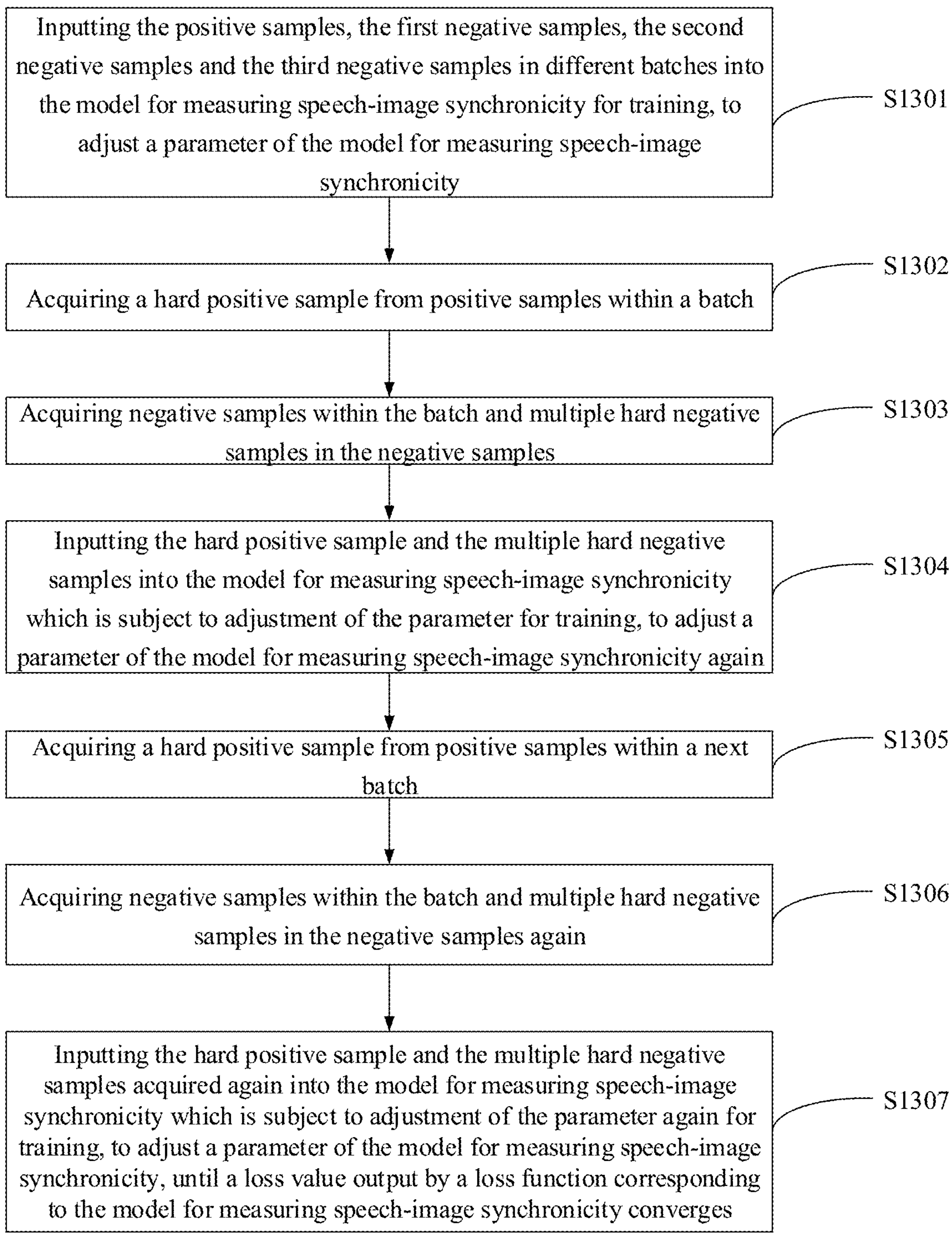
FIG. 13 is a flowchart of training a neural network in an embodiment of the application.

FIG. 13 is a flowchart of training a neural network in an embodiment of the application. As shown in FIG. 13, the process may include two stages: an earlier training stage and a later training stage. Details are as follows.

1. Earlier Training Stage

S1301: inputting the positive samples, the first negative samples, the second negative samples and the third negative samples in different batches into the model for measuring speech-image synchronicity for training, to adjust a parameter of the model for measuring speech-image synchronicity. Among them, by balancing sampling, the number of positive samples and the number of negative samples within each batch would be similar, which is helpful for model training.

Specifically, the parameter(s) of the model for measuring speech-image synchronicity may be adjusted through a loss function, as shown in equation (3):

$$L = \frac{1}{N}\sum_{1}^{N}(y_n * d_p + (1 - y_n) * \max(0, (\text{margin}_1 - d_n))) \tag{3}$$

Among them, L represents a loss value, N represents the number of samples in a batch, n represents an index of a sample, and $y_n$ represents a label of the sample, $y_n=1$ represents a positive sample, $y_n=0$ represents a negative sample, $d_p$ represents a distance of a positive sample, $$d_p = \|v_p - a_p\|_2^2,$$

$d_n$ represents a distance of a negative sample, $$d_n = \|v_n - a_n\|_2^2,$$

v represents a visual feature extracted by the visual neural network, a represents a speech feature extracted by the speech neural network, $\text{margin}_1$ is a specific value, which may be different from $\text{margin}_2$ in the later training stage.

For the specific way to adjust the parameter(s) of the model based on the loss function value, for example, the Adam optimization algorithm may be used to train the model, with corresponding parameters as: beta_1=0.99, beta_2=0.999. In the earlier training stage, a size of the batch may be set to 256, with training 1000 epochs (epochs), and a learning rate is initially set to 0.005. After 100 epochs (epochs), the learning rate is gradually decayed to 0 by using a cosine decay strategy. Similarly, in the later training stage, with training 500 epochs (epochs), the learning rate is initially set to 0.001, and after 100 epochs (epoch), the learning rate is gradually decayed to 0 by using a cosine decay strategy. During using, the specific training parameters and parameters of the model need to be adjusted accordingly over changes in the database. Of course, other specific manners may also be used, and there is no restriction here.

2. Later Training Stage

In order to further optimize the model for measuring speech-image synchronicity, after an earlier training of the model, it is possible to continue to adopt an online hard sample mining strategy for each training batch, hard samples mined online may be used to train the model again until the trained model is within a certain accuracy range and no longer generates a significant fluctuation.

Specifically, unlike the earlier training stage, in the later training stage, simply divide all positive samples into different batches (such as M batches), and negative samples are obtained online by combining different positive samples within the batch, which are referred as negative samples within the batch. The positive samples and the negative samples within each batch are sorted according to loss values output by a loss function based a rule; a hard positive sample is acquired from the positive samples within the current batch based on the loss values; and multiple hard negative samples are acquired from the negative samples within the current batch based on the loss values.

S1302: acquiring a hard positive sample from positive samples within a batch.

For each batch, the hard positive sample of the positive samples within the batch is acquired, for example, all positive samples may be divided into different batches; positive samples within each batch are sorted according to loss values output by a loss function; and the hard positive sample of the positive samples within the current batch is acquired according to the loss values.

Specifically, after randomly sampling N positive samples (audio and visual) from the training set to form a training batch, speech features $a_i$ and visual features $v_i$ are extracted using the current speech neural network and visual neural network, respectively, where i ε N. Then a hard positive sample within each batch is identified. The specific detail of the hard positive sample is shown in equation (4):

$$d_p^h = \max\left(\|v_i - a_i\|_2^2\right), \forall i \in N \tag{4}$$

Among them, $$d_p^h$$

represents the hard positive sample, v represents the visual feature extracted by the visual neural network, a represents the speech feature extracted by the speech neural network, and N represents an index of a sample.

S1303: acquiring negative samples within the batch and multiple hard negative samples in the negative samples.

Specifically, negative samples within the batch are generated according to the positive samples within the batch, and the multiple hard negative samples are acquired from the negative samples within the batch.

Among them, the generation of the negative samples within the batch according to the positive samples within each batch specifically includes: combining N speech features and N visual features acquired for the N positive samples in the training batch of step S1302 in pairs to generate a matrix of N×N, where positive sample combinations on the diagonal are excluded to obtain N×(N−1) combinations which are used as candidate negative samples, and qualified negative samples obtained through visual rule judgment and speech rule judgment are the negative samples within the batch.

Among them, the multiple negative samples correspond to each sample in the positive samples. That is to say, each positive sample in step S1302 corresponds to multiple negative samples. Step S1303 is to identify, for each positive sample, hard negative samples from multiple negative samples corresponding to the positive sample.

Among them, the acquiring of the multiple hard negative samples from the negative samples of each batch specifically includes, sorting, based on loss values output by a loss function, negative samples corresponding to the speech features $a_i$, and acquiring, according to the loss values, hard negative samples corresponding to the speech features $a_i$; and/or sorting, based on loss values output by a loss function, negative samples corresponding to the visual features $v_i$; and acquiring, according to the loss values, hard negative samples corresponding to the visual features $v_i$.

For example, if there are 3 positive samples, a matrix of 3×3 can be formed, positive sample combinations on the diagonal are excluded, a total of 6 candidate negative samples are obtained, namely, $$\begin{bmatrix} & \langle a_1 \mid v_2 \rangle & \langle a_1 \mid v_3 \rangle \\ \langle a_2 \mid v_1 \rangle & & \langle a_2 \mid v_3 \rangle \\ \langle a_3 \mid v_1 \rangle & \langle a_3 \mid v_2 \rangle & \end{bmatrix}.$$

After unqualified negative samples are removed from the matrix, all remaining samples in the matrix are qualified negative samples. Each i-th row in the matrix represents negative samples corresponding to a speech of an i-th positive sample, and the element with a maximum loss function in each row is recorded as a hard negative sample corresponding to the speech of the i-th positive sample; similarly, an i-th column in the matrix represents negative samples corresponding to visual of the i-th positive sample, and the element with a maximum loss function in each column is recorded as a hard negative sample corresponding to the visual of the i-th positive sample.

Among them, in this embodiment, the maximum loss function corresponds to a minimum distance $$\|v_i - a_j\|_2^2.$$

Specifically, when a row or a column does not include a qualified negative sample, a hard negative sample will not be calculated.

The hard negative samples are shown in equations (5) and (6) as follows:

$$d_{naj}^h = \min\left(\|v_i - a_j\|_2^2\right), \forall i \in N \tag{5}$$

-continued $$d_{nvj}^h = \min\left(\|v_j - a_i\|_2^2\right), \forall i \in N \tag{6}$$

Among them, $$d_{naj}^h$$

represents a distance of a hard negative sample corresponding to a speech of a j-th positive sample, $$d_{nvj}^h$$

represents a distance of a hard negative sample corresponding to a visual of the j-th positive sample, v represents the visual feature extracted by the visual neural network, and a represents the speech feature extracted by the speech neural network.

Among them, when the j-th row does not include a qualified negative sample, $$d_{naj}^h = 10 * |\text{margin}_2|, \text{ margin}_2$$

is a specific value. Similarly, when the j-th column does not include a qualified negative sample, $$d_{nvj}^h = 10 * |\text{margin}_2|.$$

That is to say, the essence of hard negative sample mining is sorting. Within a training batch, for a speech sample $a_j$, all visual samples within the batch are traversed, and negative sample pair combinations $(v_0,a_j), \ldots, (v_N,a_j)$ are constructed. If there are qualified negative samples, a hard negative sample pair is selected from the qualified negative samples. And for a visual sample $v_j$, all speech samples within the batch are traversed, and negative sample pair combinations $(v_j,a_0), \ldots, (v_j,a_N)$ are constructed. If there are qualified negative samples, a hard negative sample pair is selected from the qualified negative samples.

S1304: inputting the hard positive sample and the multiple hard negative samples into the model for measuring speech-image synchronicity subject to adjustment of the parameter for training, to adjust a parameter of the model for measuring speech-image synchronicity again.

After online mining of the hard positive sample and the hard negative samples from the positive samples and the negative samples, there is no need to calculate losses of all positive samples and negative samples within the batch. Therefore, the loss function corresponding to the model for measuring speech-image synchronicity also changes accordingly. The specific loss function changed is shown in equation (7):

$$L = d_p^h + \frac{1}{N}\sum_{j=0}^{N}\max\left(0, \left(\text{margin}_2 - d_{naj}^h\right)\right) + \frac{1}{N}\sum_{j=0}^{N}\max\left(0, \left(\text{margin}_2 - d_{nvj}^h\right)\right) \tag{7}$$

Among them, L represents a loss value, $$d_p^h$$

represents a distance of a hard positive sample, $$d_{naj}^h$$

represents a distance of a hard negative sample corresponding to a speech of the j-th positive sample, $$d_{nvj}^h$$

represents a distance of a hard negative sample corresponding to a visual of the j-th positive sample, N represents the number of samples in the batch, $\text{margin}_2$ is a specific value.

The parameter(s) in the model for measuring speech-image synchronicity may be further adjusted by using the hard positive sample and the hard negative samples, as well as the corresponding changed loss function, so that the model may be further optimized to improve the accuracy of model prediction.

In an actual model optimization process, generally speaking, multiple optimizations are performed rather than simply one optimization. That is to say, after once-optimization to the model using the training data of the current batch, training data within a next batch is used again to obtain a corresponding hard positive sample and hard negative samples, which are input into the current model for further training, such process is repeated multiple times until an output value of the corresponding loss function is maintained in a stable range, that is, the output value is within a certain accuracy range and no longer generates a significant fluctuation.

S1305: acquiring a hard positive sample from positive samples within a next batch.

S1306: acquiring negative samples within the batch and multiple hard negative samples in the negative samples again.

Among them, the multiple hard negative samples correspond to each sample in the positive samples.

S1307: inputting the hard positive sample and the multiple hard negative samples acquired again into the model for measuring speech-image synchronicity which is subject to adjustment of the parameter again for training, to adjust a parameter of the model for measuring speech-image synchronicity, until a loss value output by a loss function corresponding to the model for measuring speech-image synchronicity converges, that is, until a loss value is within a certain accuracy range and no longer generates a significant fluctuation.

The specific implementations of steps S1305, S1306, and S1307 are similar to those of steps S1302, S1303, and S1304 mentioned above, which will not be repeated here.

After processing m batches of samples in the above manner, the training of the model for measuring speech-image synchronicity is completed. Among them, m is less than or equal to M (M is the number of batches into which positive samples are divided). When it is necessary to measure whether there is synchronicity between a speech segment and an image segment in a certain video, the speech segment and the image segment in the video are processed through steps S202-S205 and S206-S212 respectively, and then input into the model for measuring speech-image synchronicity, and an output result of the model can represent whether there is synchronicity between the speech segment and the image segment of the video.

Here, a complete explanation has been provided for the process of the method for measuring speech-image synchronicity provided in the embodiments of the application.

Figure 14:
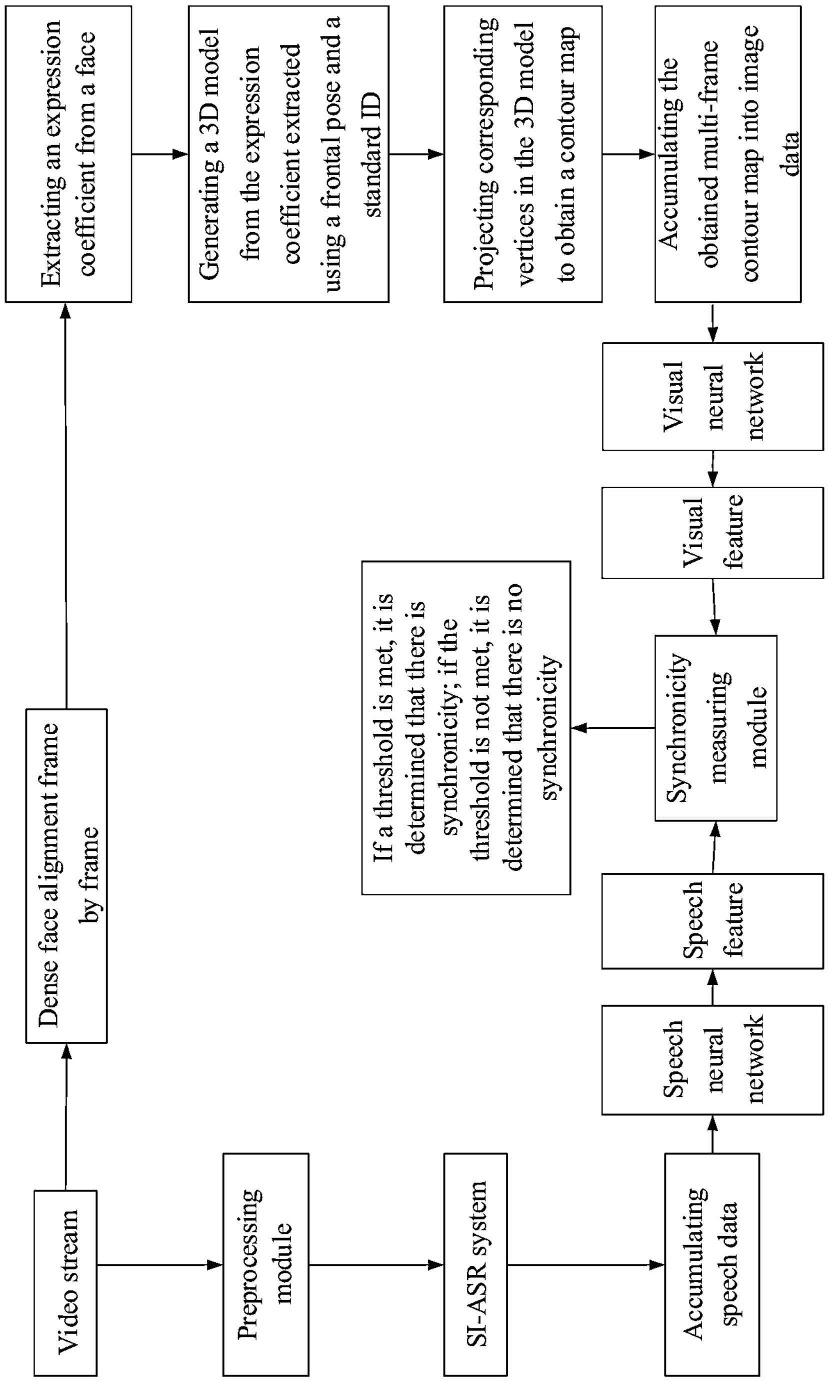
FIG. 14 is a complete flowchart of a method for measuring speech-image synchronicity in an embodiment of the application.

FIG. 14 is a complete flowchart of a method for measuring speech-image synchronicity in an embodiment of the application. As shown in FIG. 14, after acquiring a video stream, the video stream is divided into two paths. On one path, the video stream is input into a preprocessing module through which the video stream is preprocessed to obtain a speech segment. Then the speech segment is input into an SI-ASR system to process the video stream into a PPG signal. Multiple single-frame PPG signals are accumulated into one piece of speech data. Then the speech data is input into a speech neural network to obtain a speech feature. On the other path, dense face alignment is performed on the video stream frame by frame. In a single frame of image, there may be multiple faces, and the following steps need to be performed for each face: extracting an expression coefficient from the face; generating a 3D model from the expression coefficient extracted from the facial image using a frontal pose and a standard ID; and projecting corresponding vertices in the 3D model to obtain a contour map. The obtained multi-frame contour maps are accumulated into image data. Then the image data is input into a visual neural network to obtain a visual feature. Finally, the speech feature and the visual feature are input into a synchronicity measuring module to measure whether there is synchronicity between the speech and the image in the video stream. If a threshold is met, it is determined that there is synchronicity; if the threshold is not met, it is determined that there is no synchronicity. Through the synchronicity measuring module, it is possible to determine whether there is synchronicity between the speech feature and the visual feature. The specific synchronicity measurement may be achieved by calculating a distance between the speech feature and the visual feature in vectors, and then comparing the distance with the preset threshold. Finally, through the synchronicity measuring module, a face with the optimal synchronicity may be determined. If, for all faces in the video, the synchronicity does not reach the preset threshold, it is determined that there is no suitable face in the video image in the current time segment.

Figure 15:
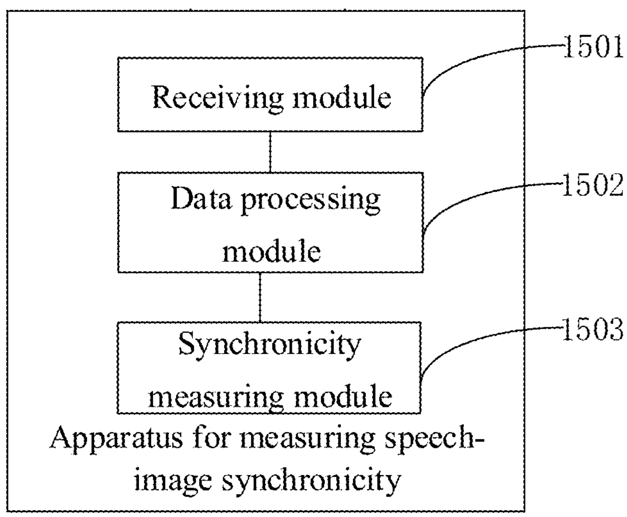
FIG. 15 is a schematic diagram I of a structure of an apparatus for measuring speech-image synchronicity in an embodiment of the application.

Based on the same invention concept, as an implementation of the above method for measuring speech-image synchronicity, an embodiment of the application further provides an apparatus for measuring speech-image synchronicity. FIG. 15 is a schematic diagram I of a structure of an apparatus for measuring speech-image synchronicity in an embodiment of the application. As shown in FIG. 15, the apparatus may include:

a receiving module 1501, configured to acquire a speech segment and an image segment of a video;

a data processing module 1502, configured to process the speech segment and the image segment to obtain a speech feature of the speech segment and a visual feature of the image segment; and a synchronicity measuring module 1503, configured to determine whether there is synchronicity between the speech segment and the image segment according to the speech feature of the speech segment and the visual feature of the image segment.

Furthermore, as a refinement of the apparatus shown in FIG. 15, the data processing module 1502 of the apparatus may be specifically configured to perform any of following operations: convert the speech segment into a specific signal and acquire a speech feature of the specific signal and a visual feature of the image segment, where the specific signal is independent of a personal feature of a speaker in the speech segment; or, generate a contour map of a target character according to the image segment, and acquire a visual feature of the contour map and a speech feature of the speech segment, where the contour map is independent of a personal feature of the target character; or, convert the speech segment into a specific signal, generate a contour map of a target character according to the image segment, and acquire a speech feature of the specific signal and a visual feature of the contour map.

Figure 16:
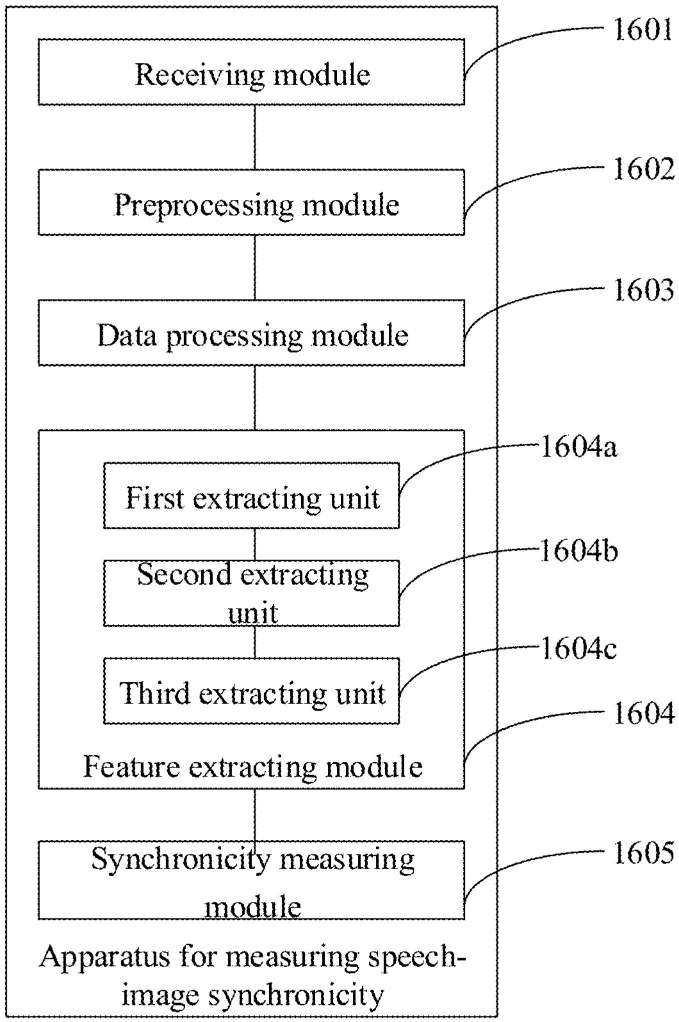
FIG. 16 is a schematic diagram II of a structure of an apparatus for measuring speech-image synchronicity in an embodiment of the application.

Furthermore, as a refinement and extension of the apparatus shown in FIG. 15, an embodiment of the application further provides an apparatus for measuring speech-image synchronicity. FIG. 16 is a schematic diagram II of a structure of an apparatus for measuring speech-image synchronicity in an embodiment of the application. As shown in FIG. 16, the apparatus may include:

a receiving module 1601, a preprocessing module 1602, a data processing module 1603, a feature extracting module 1604 and a synchronicity measuring module 1605.

In an implementation, the receiving module 1601 is configured to acquire a speech segment and an image segment of a video.

In an implementation, the preprocessing module 1602 is configured to convert a sampling frequency of the speech segment to a specific frequency; correspondingly, the data processing module 1603 is configured to convert the speech segment converted to the specific frequency into a specific signal.

In an implementation, the preprocessing module 1602 is configured to remove a background sound from the speech segment, separate speeches of different speakers in the speech segment subject to removal of the background sound to obtain at least one speech sub-segment; correspondingly, the data processing module 1603 is configured to convert the speech sub-segment into a specific signal.

In an implementation, the preprocessing module 1602 is configured to segment the speech segment into multiple speech frames using a sliding weighting manner, where there is an overlap between adjacent speech frames; correspondingly, the data processing module 1603 is configured to convert the multiple speech frames into multiple specific signals respectively.

In an implementation, the specific signal is a phonetic posterior grams PPG signal.

In an implementation, the data processing module 1603 is specifically configured to convert the speech segment into the phonetic posterior grams PPG signal through a speaker-independent automatic speech recognition SI-ASR system.

In an implementation, the feature extracting module 1604 is configured to obtain a visual feature of the image segment through a visual neural network.

In an implementation, the feature extracting module 1604 includes:

a first extracting unit 1604*a*, configured to process, using multiple one-dimensional convolutional layers, the specific signal in a time dimension to obtain a feature matrix, where a number of the one-dimensional convolutional layers is related to a corresponding duration of the specific signal;

a second extracting unit 1604*b*, configured to reorganize the feature matrix into an eigenvector; and a third extracting unit 1604*c*, configured to process the eigenvector using three fully connected layers and one linear projection layer, to obtain the speech feature.

In an implementation, the synchronicity measuring module 1605 is configured to determine whether there is synchronicity between the speech segment and the image segment according to the speech feature and the visual feature.

Figure 17:
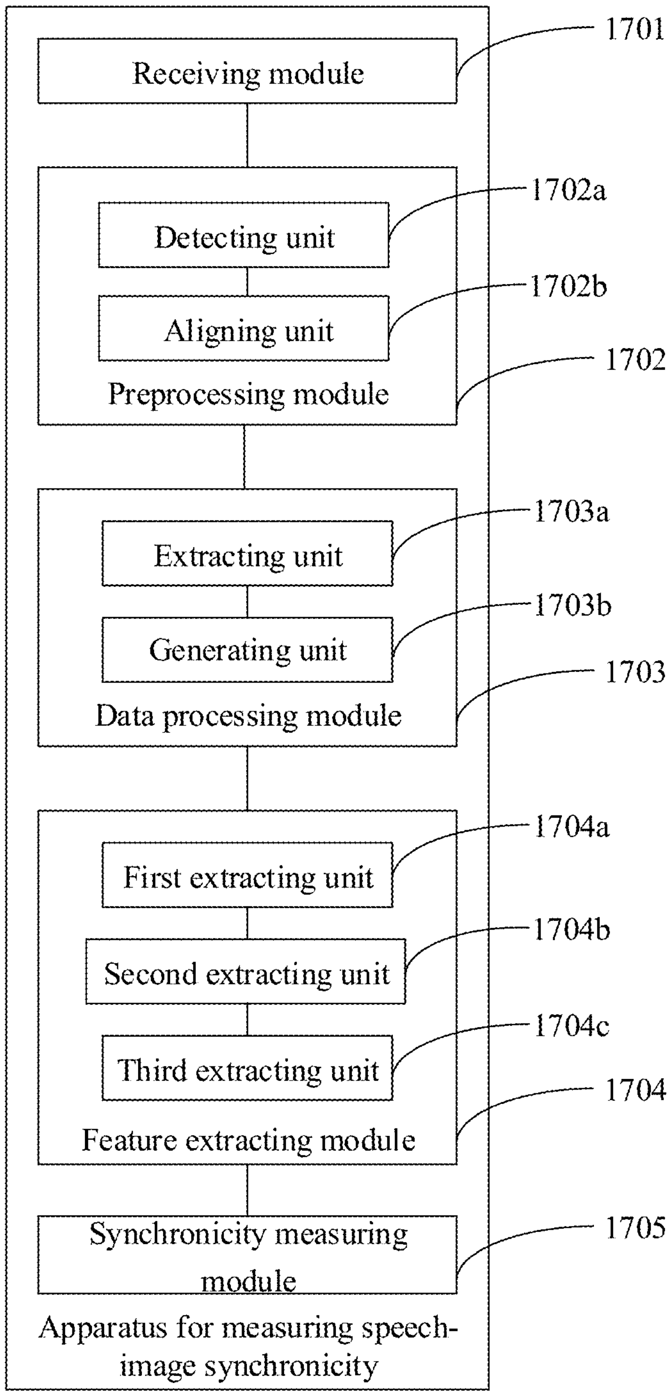
FIG. 17 is a schematic diagram III of a structure of an apparatus for measuring speech-image synchronicity in an embodiment of the application.

Furthermore, as a refinement and extension of the apparatus shown in FIG. 15, an embodiment of the application further provides an apparatus for measuring speech-image synchronicity. FIG. 17 is a schematic diagram III of a structure of an apparatus for measuring speech-image synchronicity in an embodiment of the application. As shown in FIG. 17, the apparatus may include:

a receiving module 1701, a preprocessing module 1702, a data processing module 1703, a feature extracting module 1704 and a synchronicity measuring module 1705.

In an implementation, the receiving module 1701 is configured to acquire a speech segment and an image segment of a video.

In an implementation, the preprocessing module 1702 includes:

a detecting unit 1702*a*, configured to perform face detection on the image segment to obtain a face detection box; and an aligning unit 1702*b*, configured to align a face in the face detection box horizontally.

In an implementation, the data processing module 1703 is configured to generate a contour map of a target character according to the image segment, where the contour map is independent of a personal feature of the target character.

In an implementation, when the contour map is a facial contour map, the data processing module 1703 includes:

an extracting unit 1703*a*, configured to extract an expression coefficient of the target character from the image segment; and a generating unit 1703*b*, configured to generate the facial contour map of the target character based on the expression coefficient and a general parameterized facial model.

In an implementation, the extracting unit 1703*a* is specifically configured to extract the expression coefficient of the target character from the image segment through a parameter estimation algorithm for a three-dimensional deformable parameterized facial model, where the expression coefficient meets a standard of the three-dimensional deformable parameterized facial model.

In an implementation, the generating unit 1703*b* is specifically configured to extract a lower half-face expression coefficient corresponding to a lower half face in the expression coefficient; input the lower half-face expression coefficient into the universal three-dimensional facial model to obtain a three-dimensional facial model corresponding to the lower half face of the target character, and process the three-dimensional facial model into the facial contour map of the target character.

In an implementation, the generating unit 1703*b* is specifically configured to input the lower half-face expression coefficient into the universal three-dimensional facial model to obtain a three-dimensional facial model corresponding to the lower half face of the target character; acquire a vertex set of the lower half face in the three-dimensional facial model; project the vertex set onto a two-dimensional plane to obtain a lower half-face contour map of the target character, and take the lower half-face contour map as the facial contour map of the target character.

In an implementation, the feature extracting module 1704 is configured to obtain a speech feature of the speech segment through a speech neural network.

In an implementation, the feature extracting module 1704 includes:

a first extracting unit 1704*a*, configured to process the contour map using a convolutional layer, to obtain a feature matrix, where a convolutional kernel size and a step size of the convolutional layer are related to a size of the contour map;

a second extracting unit 1704*b*, configured to process the feature matrix using a backbone network of a visual neural network to obtain an eigenvector; and a third extracting unit 1704*c*, configured to process the eigenvector using a fully connected layer, to obtain the visual feature.

In an implementation, the synchronicity measuring module 1705 is configured to determine whether there is synchronicity between the speech segment and the image segment according to the speech feature and the visual feature.

In an implementation, when the video is a video of multiple people talking, the synchronicity measuring module 1705 is configured to determine a speaker corresponding to the speech segment in the video according to the speech feature and the visual feature.

When the video is a video to be verified for authenticity, the synchronicity measuring module 1705 is configured to determine whether the speech segment in the video belongs to a character in the image segment according to the speech feature and the visual feature.

When the video is a video to be modulated, the synchronicity measuring module 1705 is configured to align starting bits of the speech segment and the image segment in the video according to the speech feature and the visual feature, to enable the speech segment to be synchronized with the image segment.

It should be pointed out that, the description of the above embodiments of the apparatus for measuring speech-image synchronicity is similar to the description of the above embodiments of the method measuring speech-image synchronicity, and has beneficial effects similar to the method embodiments. For the technical details not disclosed in the apparatus embodiments of the application, please refer to the description of the method embodiments of the application for understanding.

Figure 18:
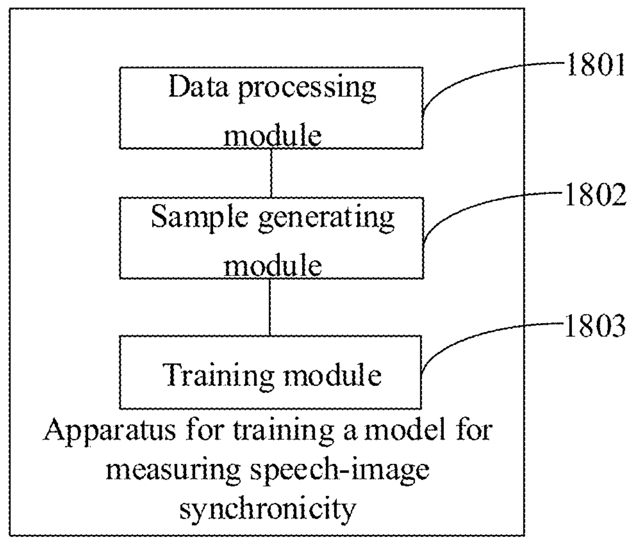
FIG. 18 is a schematic diagram I of a structure of an apparatus for training a model for measuring speech-image synchronicity in an embodiment of the application.

Based on the same invention concept, as an implementation of the above method for training a model for measuring speech-image synchronicity, an embodiment of the application further provides an apparatus for training a model for measuring speech-image synchronicity. FIG. 18 is a schematic diagram I of a structure of an apparatus for training a model for measuring speech-image synchronicity in an embodiment of the application. As shown in FIG. 18, the apparatus may include:

a data processing module 1801, a sample generating module 1802 and a training module 1803.

In an implementation, the data processing module 1801 is configured to process a first image segment as first image data, process a first speech segment as first speech data, and process a second speech segment as second speech data; where the first image segment, the first speech segment, and the second speech segment are from a first training video, there is synchronicity between the first image segment and the first speech segment, and there is no synchronicity between the first image segment and the second speech segment.

In an implementation, the data processing module 1801 is further configured to process a random image segment as second image data, and process a random speech segment as third speech data, where the random image segment and the random speech segment are from a second training video.

In an implementation, the sample generating module 1802 is configured to combine the first image data and the first speech data into positive samples.

In an implementation, the sample generating module 1802 is further configured to combine the first image data and the second speech data into first negative samples.

In an implementation, the sample generating module 1802 is further configured to combine the first image data and the third speech data into second negative samples.

In an implementation, the sample generating module 1802 is further configured to combine the first speech data or the second speech data, and the second image data into third negative samples.

In an implementation, the training module 1803 is configured to train the model for measuring speech-image synchronicity using the positive samples, the first negative samples, the second negative samples and the third negative samples.

Figure 19:
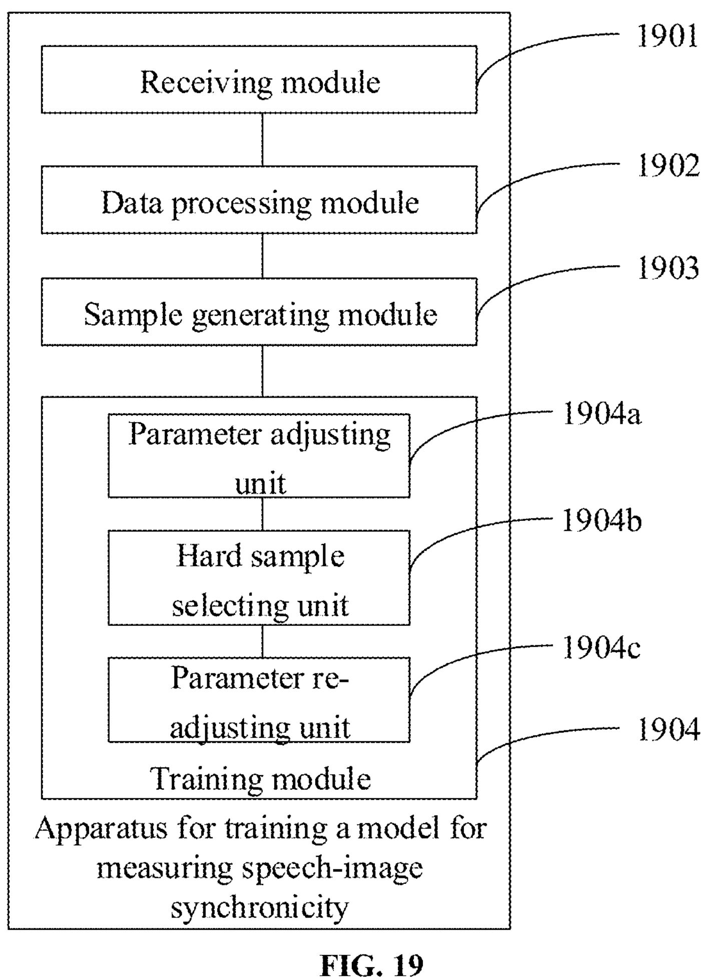
FIG. 19 is a schematic diagram II of a structure of an apparatus for training a model for measuring speech-image synchronicity in an embodiment of the application.

Furthermore, as a refinement and extension of the apparatus shown in FIG. 18, an embodiment of the application further provides an apparatus for training a model for measuring speech-image synchronicity. FIG. 19 is a schematic diagram II of a structure of an apparatus for training a model for measuring speech-image synchronicity in an embodiment of the application. As shown in FIG. 19, the apparatus may include:

a receiving module 1901, a data processing module 1902, a sample generating module 1903 and a training module 1904.

In an implementation, the receiving module 1901 is configured to acquire a first image segment, a first speech segment, and a second speech segment of a first training video, where there is synchronicity between the first image segment and the first speech segment, and there is no synchronicity between the first image segment and the second speech segment.

In an implementation, the receiving module 1901 is further configured to acquire a random image segment and a random speech segment from a second training video.

In an implementation, frame lengths of the first image segment and the random image segment are less than a frame length of the first speech segment, a frame length of the second speech segment, or a frame length of the random speech segment.

In an implementation, the number of speech frames in speech data is related to a number of image frames in image data, where the speech data includes the first speech data, the second speech data, or the third speech data, and the image data includes the first image data or the second image data.

In an implementation, a duration of misalignment between the second speech segment and the first image segment is greater than or equal to twice a total duration of the second speech segment.

In an implementation, the first image segment and the random image segment are images at one or more consecutive time points.

In an implementation, a training video is a portrait video of a single person speaking, and an interference level of a background sound in the training video is less than a specific level; where the training video includes the first training video and the second training video.

In an implementation, the data processing module 1902 is configured to extract a contour map of a target character from the first image segment and a contour map of target character the random image segment respectively, where the contour map is independent of a personal feature of the target character; and/or, the data processing module 1902 is further configured to convert the first speech segment, the second speech segment, and the random speech segment into specific signals, where the specific signals are independent of personal features of speakers in the first speech segment, the second speech segment, and the random speech segment.

In an implementation, the sample generating module 1903 is configured to combine the first image data and the first speech data into positive samples; the sample generating module 1903 is further configured to combine the first image data and the second speech data into first negative samples; the sample generating module 1903 is further configured to combine the first image data and the third speech data into second negative samples; and the sample generating module 1903 is further configured to combine the first speech data or the second speech data, and the second image data into third negative samples.

In an implementation, the sample generating module 1903 is specifically configured to, combine the first image data and the second speech data into the first negative samples when it is determined that speech data corresponding to the first image data differs from the second speech data in terms of their phonetic posterior grams PPG, and the first image data differs from image data corresponding to the second speech data in terms of their movements of lower half faces; combine the first image data and the third speech data into the second negative samples when it is determined that speech data corresponding to the first image data is different from the third speech data in terms of their phonetic posterior grams, and the first image data differs from image data corresponding to the third speech data in terms of their movements of lower half faces; and combine the first speech data or the second speech data, and the second image data into the third negative samples when it is determined that speech data corresponding to the second image data differs from the first speech data or the second speech data in terms of their phonetic posterior grams, and the second image data differs from image data corresponding to the first speech data or the second speech data in terms of their movements of lower half faces.

In an implementation, the training module 1904 includes:

a parameter adjusting unit 1904*a*, configured to input the positive samples, the first negative samples, the second negative samples and the third negative samples in batches into the model for measuring speech-image synchronicity for training, to adjust a parameter of the model for measuring speech-image synchronicity;

a hard sample selecting unit 1904*b*, configured to acquire a hard positive sample from positive samples within each batch;

the hard sample selecting unit 1904*b* is further configured to generate negative samples within each batch according to the positive samples within each batch, and acquire multiple hard negative samples from the negative samples within each batch;

a parameter re-adjusting unit 1904*c*, configured to input the hard positive sample and the multiple hard negative samples into the model for measuring speech-image synchronicity subject to adjustment of the parameter for training, to adjust a parameter of the model for measuring speech-image synchronicity, until a loss value output by a loss function corresponding to the model for measuring speech-image synchronicity converges.

In an implementation, the hard sample selecting unit 1904b is further configured to combine N speech features $a_i$ and N visual features $v_i$ corresponding to N positive samples in each batch in pairs to obtain N×(N−1) candidate negative samples; determine qualified negative samples obtained through visual rule judgment and speech rule judgment on the candidate negative samples as the negative samples within the batch; where i ε N, and N is a positive integer.

In an implementation, the hard sample selecting unit 1904b is further configured to sort negative samples corresponding to the speech features $a_i$ based on loss values output by a loss function; acquire hard negative samples corresponding to the speech features $a_i$ according to the loss values; and/or sort negative samples corresponding to the visual features $v_i$ based on loss values output by a loss function; acquire hard negative samples corresponding to the visual features $v_i$ according to the loss values.

In an implementation, the hard sample selecting unit 1904b is further configured to divide all positive samples into different batches; sort the positive samples within each batch based on loss values output by a loss function; and acquire the hard positive sample from the positive samples within the current batch based on the loss values.

After processing m batches of samples in the above manner, the training of the model for measuring speech-image synchronicity is completed. Among them, m is less than or equal to M (M is the number of batches into which the positive samples are divided).

It should be pointed out that, the description of the above embodiments of the apparatus for training a model for measuring speech-image synchronicity is similar to the description of the above embodiments of the method training a model for measuring speech-image synchronicity, and has beneficial effects similar to the method embodiments. For the technical details not disclosed in the apparatus embodiments of the application, please refer to the description of the method embodiments of the application for understanding.

Figure 20:
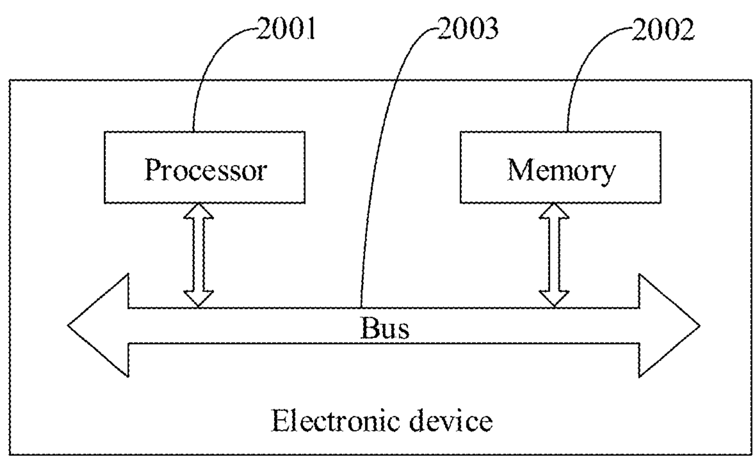
FIG. 20 is a schematic diagram of a structure of an electronic device in an embodiment of the application.

Based on the same inventive concept, an embodiment of the application further provides an electronic device. FIG. 20 is a schematic diagram of a structure of an electronic device in an embodiment of the application. As shown in FIG. 20, the electronic device may include: a processor 2001, a memory 2002, and a bus 2003; where the processor 2001 and the memory 2002 communicate with each other through the bus 2003; and the processor 2001 is configured to call program instructions in the memory 2002 to execute the method in one or more embodiments mentioned above.

An embodiment of the present application further provides a computer program product, where a computer program is stored on the computer program product, and when the computer program is executed by the processor, the method in one or more embodiments mentioned above is implemented, and the same technical effects can be achieved, which will not be repeated here to avoid repetition.

An embodiment of the present application further provides a computer program, where when the computer program is executed by the processor, the method in one or more embodiments mentioned above is implemented, and the same technical effects can be achieved, which will not be repeated here to avoid repetition.

It should be pointed out that, the description of the above embodiment of the electronic device is similar to the description of the above method embodiments, and has beneficial effects similar to the method embodiments. For the technical details not disclosed in the electronic device embodiment of the application, please refer to the description of the method embodiments of the application for understanding.

Based on the same invention concept, an embodiment of the application further provides a computer-readable storage medium, including a stored program; where the program controls a device on which the storage medium is located to execute the methods in one or more embodiments mentioned above when the program is running.

It should be pointed out that the description of the above embodiment of the storage medium is similar to the description of the above method embodiments, and has beneficial effects similar to the method embodiments. For the technical details not disclosed in the storage medium embodiment of the application, please refer to the description of the method embodiments of the application for understanding.

The above is only specific implementations of the application, but the scope of protection of the application is not limited thereto. Any changes or replacements that can be easily imagined by the persons skilled in the art within the scope of disclosure of the application should be covered within the scope of protection of the application. Therefore, the scope of protection of the application should be based on the scope of protection of the claimed claims.

What is claimed is:

1. A method for measuring speech-image synchronicity, comprising:

acquiring a speech segment and an image segment of a video, wherein there is a correspondence between the speech segment and the image segment in the video;

processing the speech segment and the image segment to obtain a speech feature of the speech segment and a visual feature of the image segment;

inputting, the speech feature of the speech segment and the visual feature of the image segment into a pre-trained model for measuring speech-image synchronicity, to determine whether there is synchronicity between the speech segment and the image segment, wherein the synchronicity is used for characterizing matching between a sound in the speech segment and a movement of a target character in the image segment;

wherein processing the speech segment and the image segment to obtain the speech feature of the speech segment and the visual feature of the image segment comprises:

generating a contour map of a target character according to the image segment, wherein the contour map of the target character is independent of a personal feature of the target character;

acquiring a visual feature of the contour map of the target character as the visual feature of the image segment; and acquiring a speech feature of the speech segment.

2. The method according to claim 1, wherein acquiring the speech feature of the speech segment comprises:

converting the speech segment into a specific signal, wherein the specific signal is independent of a personal feature of a speaker in the speech segment; and acquiring a speech feature of the specific signal as the speech feature of the speech segment.

3. The method according to claim 1, wherein the contour map of the target character is a facial contour map; and generating the contour map of the target character according to the image segment, comprises:

extracting an expression coefficient of the target character from the image segment;

generating, based on the expression coefficient and a general parameterized facial model, a facial contour map of the target character.

4. The method according to claim 3, wherein extracting the expression coefficient of the target character from the image segment, comprises:

extracting, through a parameter estimation algorithm for a three-dimensional deformable parameterized facial model, the expression coefficient of the target character from the image segment, wherein the expression coefficient meets a standard of the three-dimensional deformable parameterized facial model.

5. The method according to claim 4, wherein before extracting, through the parameter estimation algorithm for the three-dimensional deformable parameterized facial model, the expression coefficient of the target character from the image segment, the method further comprises:

performing face detection on the image segment to obtain a face detection box;

aligning a face in the face detection box horizontally;

wherein extracting, through the parameter estimation algorithm for the three-dimensional deformable parameterized facial model, the expression coefficient of the target character from the image segment, comprises:

extracting, through the parameter estimation algorithm for the three-dimensional deformable parameterized facial model, the expression coefficient of the target character from the aligned face.

6. The method according to claim 3, wherein the general parameterized facial model is a universal three-dimensional facial model; and generating, based on the expression coefficient and the general parameterized facial model, the facial contour map of the target character, comprises:

extracting, from the expression coefficient, a lower half-face expression coefficient corresponding to a movement of a lower half face in the expression coefficient;

inputting the lower half-face expression coefficient into the universal three-dimensional facial model to obtain a three-dimensional facial model corresponding to the lower half face of the target character, and processing the three-dimensional facial model into the facial contour map of the target character.

7. The method according to claim 6, wherein inputting the lower half-face expression coefficient into the universal three-dimensional facial model to obtain the three-dimensional facial model corresponding to the lower half face of the target character, and processing the three-dimensional facial model into the facial contour map of the target character, comprise:

inputting the lower half-face expression coefficient into the universal three-dimensional facial model to obtain the three-dimensional facial model corresponding to the lower half face of the target character;

acquiring a vertex set of the lower half face in the three-dimensional facial model;

projecting the vertex set onto a two-dimensional plane to obtain a lower half-face contour map of the target character, and taking the lower half-face contour map as the facial contour map of the target character.

8. The method according to claim 1, wherein acquiring the visual feature of the contour map of the target character, comprises:

processing, using a convolutional layer, the contour map of the target character to obtain a feature matrix, wherein a convolutional kernel size and a step size of the convolutional layer are related to a size of the contour map of the target character;

processing, using a backbone network of a visual neural network, the feature matrix to obtain an eigenvector;

processing, using a fully connected layer, the eigenvector to obtain the visual feature, wherein a dimension of the visual feature is related to an amount of data in the contour map of the target character and a type of a loss function used by the visual neural network.

9. The method according to claim 2, wherein before converting the speech segment into the specific signal, the method further comprises:

converting a sampling frequency of the speech segment to a specific frequency;

wherein converting the speech segment into the specific signal, comprises:

converting the speech segment converted to the specific frequency into the specific signal;

removing a background sound from the speech segment;

separating speeches of different speakers in the speech segment subject to removal of the background sound to obtain at least one speech sub-segment;

wherein converting the speech segment into the specific signal, comprises:

converting the at least one speech sub-segment into the specific signal;

segmenting, using a sliding weighting manner, the speech segment into multiple speech frames, wherein there is an overlap between adjacent speech frames;

wherein converting the speech segment into the specific signal, comprises:

converting the multiple speech frames into multiple specific signals respectively.

10. The method according to claim 2, wherein acquiring the speech feature of the specific signal, further comprises:

processing, using multiple one-dimensional convolutional layers, the specific signal in a time dimension to obtain a feature matrix, wherein a number of the one-dimensional convolutional layers is related to a corresponding duration of the specific signal, and the specific signal is a phonetic posterior grams PPG signal;

reorganizing the feature matrix into an eigenvector;

processing, using three fully connected layers and one linear projection layer, the eigenvector to obtain the speech feature, wherein a dimension of the speech feature is related to an amount of data in the speech segment and a type of a loss function used by a speech neural network.

11. The method according to claim 1, wherein the video is a video of multiple people talking; wherein determining, according to the speech feature of the speech segment and the visual feature of the image segment, whether there is synchronicity between the speech segment and the image segment, comprises: determining, according to the speech feature and the visual feature, a speaker corresponding to the speech segment in the video; or, the video is a video to be verified for authenticity; wherein determining, according to the speech feature of the speech segment and the visual feature of the image segment, whether there is synchronicity between the speech segment and the image segment, comprises:

determining, according to the speech feature and the visual feature, whether the speech segment in the video belongs to a character in the image segment; or, the video is a video to be modulated; wherein determining, according to the speech feature of the speech segment and the visual feature of the image segment, whether there is synchronicity between the speech segment and the image segment, comprises: aligning, according to the speech feature and the visual feature, starting bits of the speech segment and the image segment in the video, to enable the speech segment to be synchronized with the image segment.

12. The method according to claim 1, wherein the pre-trained model for measuring speech-image synchronicity is trained by steps of:

processing a first image segment as first image data, processing a first speech segment as first speech data, and processing a second speech segment as second speech data; wherein the first image segment, the first speech segment, and the second speech segment are from a first training video, there is synchronicity between the first image segment and the first speech segment, and there is no synchronicity between the first image segment and the second speech segment;

processing a random image segment as second image data, and processing a random speech segment as third speech data, wherein the random image segment and the random speech segment are from a second training video;

combining the first image data and the first speech data into positive samples;

combining the first image data and the second speech data into first negative samples;

combining the first image data and the third speech data into second negative samples;

combining the first speech data or the second speech data, and the second image data into third negative samples;

training a model for measuring speech-image synchronicity using the positive samples, the first negative samples, the second negative samples and the third negative samples, to obtain the pre-trained model for measuring speech-image synchronicity.

13. The method according to claim 12, wherein a number of speech frames in speech data is related to a number of image frames in image data, wherein the speech data comprises the first speech data, the second speech data, or the third speech data, and the image data comprises the first image data or the second image data;

or a duration of misalignment between the second speech segment and the first image segment is greater than or equal to twice a total duration of the second speech segment;

or the first image segment and the random image segment are images at one or more consecutive time points.

14. The method according to claim 12, wherein combining the first image data and the second speech data into the first negative samples; combining the first image data and the third speech data into the second negative samples; and combining the first speech data or the second speech data, and the second image data into the third negative samples, comprise:

when it is determined that speech data corresponding to the first image data differs from the second speech data in terms of phonetic posterior grams PPG, and the first image data differs from image data corresponding to the second speech data in terms of movements of lower half faces, combining the first image data and the second speech data into the first negative samples;

when it is determined that speech data corresponding to the first image data is different from the third speech data in terms of phonetic posterior grams, and the first image data differs from image data corresponding to the third speech data in terms of movements of lower half faces, combining the first image data and the third speech data into the second negative samples;

when it is determined that speech data corresponding to the second image data differs from the first speech data or the second speech data in terms of phonetic posterior grams, and the second image data differs from image data corresponding to the first speech data or the second speech data in terms of movements of lower half faces, combining the first speech data or the second speech data, and the second image data into the third negative samples.

15. The method according to claim 12, wherein processing the first image segment as the first image data, processing the first speech segment as the first speech data, processing the second speech segment as the second speech data, processing the random image segment as the second image data, and processing the random speech segment as the third speech data, comprise:

generating, according to the first image segment, a contour map of the target character to obtain the first image data;

generating, according to the random image segment, a contour map of the target character to obtain a second image data; wherein the contour map of the target character is independent of a personal feature of the target character;

converting the first speech segment into a specific signal to obtain the first speech data;

converting the second speech segment into a specific signal to obtain the second speech data;

converting the random speech segment into a specific signal to obtain the third speech data; wherein the specific signals are independent of personal features of speakers in the first speech segment, the second speech segment, and the random speech segment.

16. The method according to claim 12, wherein training the model for measuring speech-image synchronicity using the positive samples, the first negative samples, the second negative samples and the third negative samples, comprises:

dividing the training of the model for measuring speech-image synchronicity into two stages comprising an earlier training stage and a later training stage;

during the earlier training stage, inputting the positive samples, the first negative samples, the second negative samples and the third negative samples in batches into the model for measuring speech-image synchronicity for training, to adjust a parameter of the model for measuring speech-image synchronicity;

during the later training stage, inputting the positive samples in batches into the model for measuring speech-image synchronicity subject to adjustment of the parameter for training;

wherein inputting the positive samples in batches into the model for measuring speech-image synchronicity subject to adjustment of the parameter for training comprises:

acquiring a hard positive sample from positive samples within each batch;

generating, according to the positive samples within each batch, negative samples within the batch;

acquiring multiple hard negative samples from the negative samples within each batch;

inputting the hard positive sample and the multiple hard negative samples into the model for measuring speech-image synchronicity subject to adjustment of the parameter for training, to adjust a parameter of the model for measuring speech-image synchronicity, until a loss value output by a loss function corresponding to the model for measuring speech-image synchronicity converges.

17. An electronic device, comprising a processor, a memory, and a bus;

wherein the processor and the memory communicate with each other through the bus; and the memory is stored with instructions executable by the processor, and the instructions are executed by the at least one processor to enable the processor to:

acquire a speech segment and an image segment of a video, wherein there is a correspondence between the speech segment and the image segment in the video;

process the speech segment and the image segment to obtain a speech feature of the speech segment and a visual feature of the image segment;

input the speech feature of the speech segment and the visual feature of the image segment into a pre-trained model for measuring speech-image synchronicity, to determine whether there is synchronicity between the speech segment and the image segment, wherein the synchronicity is used for characterizing matching between a sound in the speech segment and a movement of a target character in the image segment;

wherein the processor is further enabled to:

generate a contour map of a target character according to the image segment, wherein the contour map of the target character is independent of a personal feature of the target character;

acquire a visual feature of the contour map of the target character as the visual feature of the image segment; and acquire a speech feature of the speech segment.

18. A non-transitory computer-readable storage medium, comprising a stored program; wherein the program, when running, controls a device on which the storage medium is located to:

acquire a speech segment and an image segment of a video, wherein there is a correspondence between the speech segment and the image segment in the video;

process the speech segment and the image segment to obtain a speech feature of the speech segment and a visual feature of the image segment;

input the speech feature of the speech segment and the visual feature of the image segment into a pre-trained model for measuring speech-image synchronicity, to determine whether there is synchronicity between the speech segment and the image segment, wherein the synchronicity is used for characterizing matching between a sound in the speech segment and a movement of a target character in the image segment;

wherein the program, when running, controls a device on which the storage medium is located further to:

generate a contour map of a target character according to the image segment, wherein the contour map of the target character is independent of a personal feature of the target character;

acquire a visual feature of the contour map of the target character as the visual feature of the image segment; and acquire a speech feature of the speech segment.

19. The method according to claim 1, wherein the correspondence between the speech segment and the image segment in the video comprises:

the acquired speech segment and the image segment in the video having a same starting time and a same ending time in the video.

20. The method according to claim 1, wherein the correspondence between the speech segment and the image segment in the video comprises:

the acquired speech segment and the image segment in the video having a certain degree of temporal misalignment which is acceptable within a visual range for human eyes.

* * * * *